(12) United States Patent  
Matsuo et al.

(10) Patent No.: US 7,526,168 B2  
(45) Date of Patent: Apr. 28, 2009

(54) OPTICAL FIBER, TRANSMISSION SYSTEM, AND WAVELENGTH DIVISION MULTIPLEXING SYSTEM

(75) Inventors: Shoichiro Matsuo, Sakura (JP); Shoji Tanigawa, Sakura (JP); Keisuke Uchiyama, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/744,117

(22) Filed: May 3, 2007

(65) Prior Publication Data

US 2008/0013906 A1    Jan. 17, 2008

Related U.S. Application Data

(63) Continuation of application No. PCT/JP2005/020368, filed on Nov. 7, 2005.

(30) Foreign Application Priority Data

| Nov. 5, 2004 | (JP) | ............................. 2004-321912 |
| Mar. 17, 2005 | (JP) | ............................. 2005-077008 |
| Jul. 6, 2005 | (JP) | ............................. 2005-197639 |

(51) Int. Cl.  
*G02B 6/02* (2006.01)

(52) U.S. Cl. ....................... 385/127; 385/123

(58) Field of Classification Search ................. 385/123, 385/127  
See application file for complete search history.

(56) References Cited

U.S. PATENT DOCUMENTS

| 5,267,339 A | 11/1993 | Yamauchi et al. |
| 6,748,342 B1* | 6/2004 | Dickhaus ..................... 702/188 |
| 2004/0096170 A1 | 5/2004 | Papen et al. |
| 2004/0218882 A1* | 11/2004 | Bickham et al. ............ 385/127 |
| 2006/0171648 A1* | 8/2006 | Hasegawa ................... 385/127 |

FOREIGN PATENT DOCUMENTS

| JP | 63-43107 A | 2/1988 |
| JP | 1-129207 A | 5/1989 |
| JP | 4-1706 A | 1/1992 |
| JP | 2001-51093 A | 8/2001 |
| JP | 2001-510903 A | 8/2001 |
| JP | 2004-506930 A | 3/2004 |

OTHER PUBLICATIONS

A. R. Chraplyvy, "Limitations on Lightwave Communications Imposed by Optical-Fiber Nonlinearities", Journal of Lightwave Technology, vol. 8, No. 10, Oct. 1990, pp. 1548-1557.

(Continued)

*Primary Examiner*—Charlie Peng  
(74) *Attorney, Agent, or Firm*—Sughrue Mion, PLLC

(57) ABSTRACT

An optical fiber has a first mode field diameter in a dominant mode of an acoustic mode generated in the optical fiber different from a second mode field diameter in a light intensity distribution of the optical fiber. Furthermore, a transmission system is configured to perform an analog signal transmission, a baseband transmission, or an optical SCM transmission by use of the optical fiber.

33 Claims, 25 Drawing Sheets

OTHER PUBLICATIONS

K. Shiraki, et al., "SBS Threshold of a Fiber with a Brillouin Frequency Shift Distribution", Journal of Lightwave Technology, vol. 14, No. 1, Jan. 1996, pp. 50-57.

Jen, C.K. et al. "Role of Guided Acoustic Wave Properties in Single-Mode Optical Fiber Design" Electronics Letters, Nov. 10, 1988, vol. 24, No. 23, pp. 1419-1420.

Peter D. Dragie et al., "Optical Fiber With an Acoustic Guiding Layer for Stimulated Brillouin Scattering Suppression", Conference on Lasers and Electro-Optics (CLEO), May 2005, Vo. 3, pp. 1984-1986, lecture No. CThZ3.

Y. Koyamada et al., "Simulating and Designing Brillouin Gain Spectrum in Single-Mode Fibers", Journal of Lightwave Technology, Feb. 2004, vol. 22, No. 2, pp. 631-639.

A. Yeniay et al., Spontaneous and Stimulated Brillouin Scattering Gain Spectra in Optical Fibers. Journal of Lightwave Technology, Aug. 2002, vol. 20, No. 8, pp. 1425-1432.

N. Shibata et al., Longitudinal acoustic modes and Brillouin-gain spectra for $GeO_2$-doped-core single-mode fibers. Journal of the Optical Society of America B, Jun. 1989, vol. 6, pp. 1167-1174.

S. Fischer et al., Computation of the Brillouin spectrum in an optical fibre: method and results. Pure and Applied Optics, Jan. 1996, vol. 5, No. 1, pp. 55-70.

Yasuhei Koyamada et al., "Atarashi Te Brillourin Sanran Fiber", 2001 Nen IEICE Communications Society Conference Koen Ronbunshu 2, Aug. 29, 2001, p. 497, lecture No. B-13-12.

C.K. Jen et al., Role of guided acousitic wave properties in single-mode optical fibre design,: Electronics Letters, Nov. 10, 1988, vol. 24, No. 23, pp. 1419-1420.

Yuichi Morishita et al., "Tokushu Kussetsuritsu Bunpugata SBS Yokusei Fiber" 2005, Nen, The Institute of Electronics, Information and Communication Engineers Sogo Taikai Koen Tonbunshu Electronics, Mar. 7, 2005, pp. 195, lecture No. C-3-25.

Shoji Tanigawa et al., "Yudo Brullouin Sakuran o Yokusei shita Hikari Fiber", 2005 Nen The Institute if Electronics, Information and Communication Engineers Sogo Taikai Koen Ronbunshu Tushin, Mar. 7, 2005, p. 484, lecture No. B-13-20.

P.D. Dragic et al., "Optical Fiber with an Acoustic Guiding Layer for Stimulated Brillouin Scattering Suppression", 2005 Conference on Lasers and Electro-Optics (CLEO), May 2005, vol. 3, pp. 1984-1986, lecture No. CThZ3.

Y. Koyamada et al., "Stimulating and Designing Brillouin Gain Spectrum in Single-Mode Fibers", Journal of Lightwave Technology, Feb. 2004, vol. 22, No. 2, pp. 631-639.

Yasuhei Koyamada et al., "Brillouin Ritoku Spectrum to Hikari Fiber Kozo Parameter no Kankei," 2003 Nen IEICE Communications Society Conference Koen Rombunshu, Sep. 10, 2003, p. 470, lecture No. B-13-4.

Fumiaki Sato et al., "Yudo Brillion (SBS), Yokuatsu Fiber no Denso Tokusei", 2005 Nen IEICE Communications Society Conference Koen Ronbunshu 2, Sep. 7, 2005, p. 293, lecture B-10-75.

Makoto Shimizu et al., "Yudo Brillion (SBS) Yokuatsu Fiber ni yoru Hikari Analoge Eizo Denso", 2005 Nen The Institute of Electronics, Information and Communication Engineers Sogo Taikai Koen Ronbunshu Tushin, Mar. 7, 2005, p. 354, lecture No. B-10-64.

A. Yeniay et al., "Spontaneous and Stimulated Brillouin Scattering Gain Spectra in Optical Fibers", Journal of Lightwave Technology, Aug. 2002, vol. 20, No. 8, pp. 1425-1432.

N. Shibata et al., "Longitudinal acoustic modes and Brillouin-gain spectra for $GeO_2$-doped-core single-mode fibers," Journal of the Optical Society of America B, Jun. 1989, vol. 6, No. 6, pp, 1167-1174.

S. Fischer et al., "Computation of the Brillouin spectrum in an optical fibre: method and results," Pure and Applied Optics, Jan. 1996, vol. 5, No. 1, pp. 55-70.

* cited by examiner

OPTICAL FIBER, TRANSMISSION SYSTEM, AND WAVELENGTH DIVISION MULTIPLEXING SYSTEM

CROSS-REFERENCE TO RELATED PATENT APPLICATIONS

This Application claims priority from PCT Application No. PCT/JP2005/020368, filed Nov. 7, 2005, and from Japanese Patent Application No. 2004-321912 filed on Nov. 5, 2004, Japanese Patent Application No. 2005-77008 filed on Mar. 17, 2005, and Japanese Patent Application No. 2005-197639 filed on Jul. 6, 2005, the contents of which are incorporated herein by reference.

BACKGROUND OF THE INVENTION

1. Field of the Invention

Apparatuses consistent with the present invention relates to an optical fiber that suppresses the occurrence of Simulated Brillouin Scattering (hereinafter referred to as SBS) to allow transmission of higher-power signals.

2. Description of the Related Art

Nowadays, service, hereinafter referred to as FTTH, is available in which optical fibers are extended to individual homes to be used for exchange of various information.

As one form of FTTH that transmits various information, there is a system in which a broadcast signal and another communication signal are simultaneously transmitted in different systems by means of a single optical fiber (ITUT Recommendation G.983.3). Generally in this system, the broadcast signal is often an analog signal, a baseband signal, or an optical SCM signal.

The characteristics of the system having an optical fiber as a transmission medium are as follows:

FTTH is typically a double-star type PON (Passive Optical Network), and has a large distribution loss (typically, up to 32 branches are assumed).

Since FTTH transmits an analog signal, a baseband signal, or an optical SCM signal, a CNR (Carrier Noise Ratio) in the receiver is required to be high, and the required minimum signal light power in the light receiving portion is larger compared with the case of digital transmission used for communication.

From the viewpoint described above, in this system, the signal light power in the signal input portion needs to be large. Especially in consideration of attenuation and distribution loss during transmission of a signal light, higher power is required in a line with a longer distance or more branches. If a signal can be transmitted as far as possible and distributed to many subscribers at a time, it is more advantageous from various points of view (construction costs, maintainability, system design, etc.).

As for prior art relating to the present invention, Non-Patent Documents 1 to 3 and Patent Document 1 can be listed.

Non-Patent Document 1: A. R. Charaplyvy, J. Lightwave Technol., vol. 8, pp. 1548-1557 (1990)

Patent Document 1: U.S. Pat. No. 5,267,339

Non-Patent Document 2: K. Shiraki, et al., J. Lightwave Technol., vol. 14, pp. 50-57 (1996)

Non-Patent Document 3: Y. Koyamada, et al., J. Lightwave Technol., vol. 22, pp. 631-639 (2004)

However, in an optical transmission using an optical fiber, even if light with more than a certain power is intended to be injected into an optical fiber, SBS, which is one type of non-linear phenomenon, allows the entrance of light with a certain amount of power (hereinafter, referred to as SBS threshold power) or less and the rejected light is returned to the entrance light side as backscattered light. This phenomenon sometimes puts restrictions on signal light power in the input portion, thus posing a problem (for example, see Non-Patent Document 1).

SUMMARY OF THE INVENTION

The present invention has been achieved in view of the above circumstances, and has an object to provide an optical fiber that suppresses the occurrence of SBS to inject light with higher power into the optical fiber and that can make an SBS threshold power higher than that of a conventional optical fiber, and to provide a transmission system and wavelength division multiplexing system using the optical fiber.

To achieve the above-mentioned object, the present invention provides an optical fiber in which a first mode field diameter, that is the mode field diameter of a dominant mode of an acoustic mode generated in the optical fiber, is different from a second mode field diameter, that is the mode fields diameter of a light intensity distribution of the optical fiber.

In the optical fiber of the present invention, the first mode field diameter may be 1.6 or more times larger than, or ⅔ or less the second mode field diameter.

In the optical fiber of the present invention, the first mode field diameter, that is the mode field diameter of the dominant mode of the acoustic mode generated in the optical fiber, may be 10 μm or more, or 6 μm or less.

In the optical fiber of the present invention, by reducing an overlap between an acoustic field distribution and a light power distribution of the optical fiber, occurrence of simulated Brillouin scattering can be reduced as compared to an optical fiber with equivalent optical characteristics.

In the optical fiber of the present invention, by expanding the acoustic field distribution of the optical fiber to be larger than the light power distribution thereof, an overlap between the acoustic field distribution and the light power distribution can be reduced.

Alternatively, by making the acoustic field distribution of the optical fiber smaller than the light power distribution thereof, an overlap between the acoustic field distribution and the light power distribution can be reduced.

The optical fiber of the present invention may have a simulated Brillouin threshold power 1.5 or more times larger than that of an optical fiber with equivalent optical characteristics.

The optical fiber of the present invention may have a simulated Brillouin threshold power two or more times larger than that of an optical fiber with equivalent optical characteristics.

In the optical fiber of the present invention, a cable cut-off wavelength may be 1260 nm or less, a mode field diameter at a wavelength of 1310 nm may be 7.9 μm or more and 10.2 μm or less, and a zero-dispersion wavelength may be in a range of 1300 nm to 1324 nm.

The optical fiber of the present invention may have a core at a central portion thereof and a cladding around the periphery of the core, the cladding being composed of two or more layers with different refractive indexes.

In the above-mentioned optical fiber, the cladding is composed of two layers, wherein a cladding adjacent to the core is a first cladding, a cladding adjacent to an outer periphery of the first cladding is a second cladding, a refractive index of the first cladding is nc1, and a refractive index of the second cladding is nc2, it may be that nc1<nc2.

In the above-mentioned optical fiber, the cladding is composed of three layers. A cladding adjacent to the core is a first cladding, a cladding adjacent to an outer periphery of the first cladding is a second cladding, a cladding adjacent to an outer periphery of the second cladding is a third cladding, a refractive index of the first cladding is nc1, a refractive index of the second cladding is nc2, and a refractive index of the third cladding is nc3. It may be that nc2<nc1<nc3.

Furthermore, the present invention provides an optical fiber having two or more peaks that satisfy $g(i) \geq [0.1 \times Max(g)]$, where: $g(i)$ is an i-th peak gain from the lowest frequency of a Brillouin spectrum; and $Max(g)$ is the maximum gain among a plurality of existing peaks.

The above-mentioned optical fiber may have three or more peaks that satisfy $g(i) \geq [0.1 \times Max(g)]$.

The above-mentioned optical fiber may have two or more peaks that satisfy $g(i) \geq [0.5 \times Max(g)]$.

The above-mentioned optical fiber may have three or more peaks that satisfy $g(i) \geq [0.5 \times Max(g)]$.

Furthermore, the present invention provides a transmission system configured to perform an analog signal transmission, a baseband transmission, or an optical SCM transmission by use of the above-mentioned optical fiber according to the present invention.

Furthermore, the present invention provides a wavelength division multiplexing system configured to perform a data transmission and/or a voice transmission, in addition to an analog signal transmission and/or a baseband transmission or an optical SCM transmission by use of the above-mentioned optical fiber according to the present invention.

The present invention can provide an optical fiber that suppresses the occurrence of SBS to allow transmission of higher power signals, and a transmission system and a wavelength division multiplexing system that enable multi-branched, long-distance transmission by use of the optical fiber.

DETAILED DESCRIPTION OF EXEMPLARY EMBODIMENTS OF THE INVENTION

An optical fiber according to the present invention has a configuration in which a mode field diameter of a dominant mode of an acoustic mode generated in the optical fiber is different from a mode field diameter of a light intensity distribution of the optical fiber. As a result, occurrence of SBS can be suppressed to allow transmission of higher power signals.

SBS is a kind of inelastic scattering caused by an interaction between an acoustic phonon of a medium, such as a silica glass that forms an optical fiber, and incident light. When high power signal light is input, SBS is characterized in that a threshold power is lower than other inelastic scatterings and that most of the Brillouin scattered light is backscattered light.

Figure 1:
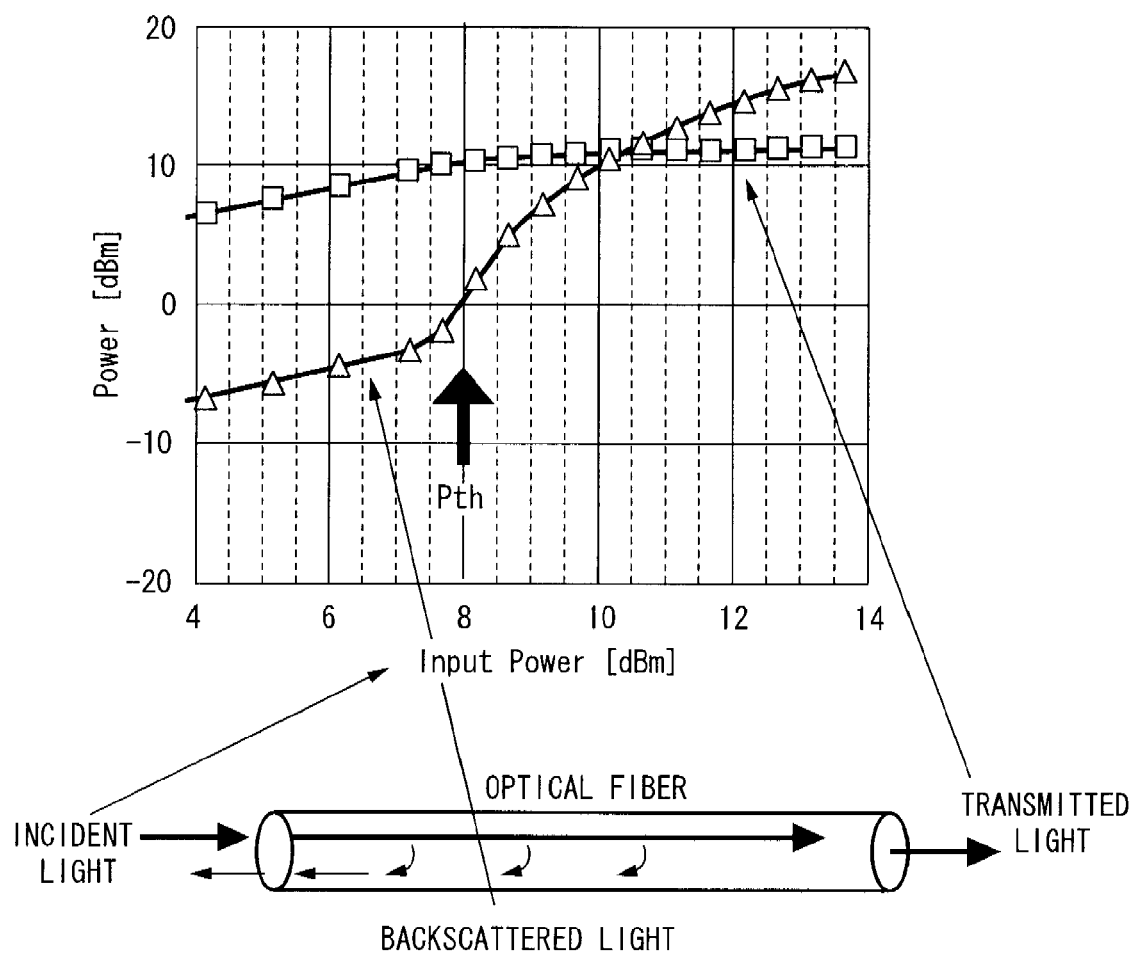
FIG. 1 is a graph illustrating a threshold power.

FIG. 1 is a graph exemplifying an SBS threshold power in a normal optical fiber. A measurement method of the SBS threshold power is described in ITU-T G.650.2, Definitions and test methods for statistical and non-linear attributed of single-mode fiber and cable, Appendix II.

This threshold power means a light intensity that causes an abrupt increase in SBS efficiency. Therefore, when the threshold power is low, SBS takes place with an incident light power lower than that for other inelastic scatterings. Furthermore, most of the generated SBS light is scattered backward (to the light injection side) and thus the SBS light does not propagate forward (to the light receiving side). Therefore, only the incident signal light attenuated by SBS propagates. These two actions prevent light with the SBS threshold power or higher from propagating forward, even if light with high power is intended to be injected into an optical fiber (See the curve showing power of the transmitted light in FIG. 1.).

When the spectral line width of the signal light is narrow, the SBS threshold power is approximately represented by Formula (1) below:

$$P_{th} = \frac{21 \cdot A_{eff}}{g_{BO} \cdot L_{eff}} \tag{1}$$

where: Pth is the SBS threshold power; Aeff is the area of an effective cross section of the core; and gBO is the Brillouin gain coefficient. Leff is an effective active length, which is obtained by Formula (2) below:

$$L_{eff} = \frac{1 - \exp(-\alpha L)}{\alpha} \tag{2}$$

where: $\alpha$ is a loss of the optical fiber; and L is an actual fiber length (line length).

As is seen from Formula (1), to improve the SBS threshold power, the effective cross section of the core Aeff may be made larger, or the Brillouin gain coefficient gBO may be made smaller. However, the selection of making Aeff larger should best be avoided, since Aeff is closely associated with other optical characteristics such as a dispersion characteristic. It follows that as a measure to be actually taken, making the Brillouin gain coefficient smaller is conceived.

When the spectral line width of the signal light is narrow, the Brillouin gain coefficient is represented by Formula (3) below, on the assumption that the Brillouin spectrum is of Lorentz type:

$$g_{BO} = \frac{2pn_0^7 p_{12}^2}{c\lambda^2 \rho_0 v_A \Delta v_B} \tag{3}$$

where: n0 is the refractive index of the optical fiber medium (silica glass, in this embodiment); p12 is the photoelasticity coefficient of Pockels; c is the velocity of light; $\lambda$ is a signal light frequency; $\rho$0 is the density of the optical fiber medium (silica glass, in this embodiment); vA is the velocity of sound in the cladding of the optical fiber; and $\Delta v$B is the full width half maximum (FWHM) of the Brillouin spectrum.

Referring to Formula (3), the parameters other than $\Delta v$B are inherent in the material or the system, and thus it is difficult to largely modify/improve them. In other words, to increase the threshold power, one solution is to expand the Brillouin spectrum width.

As for a method for expanding the Brillouin spectrum width, a technique may be used in which optical characteristics, dopant concentration, or residual stress is changed in the longitudinal direction of the optical fiber to cause a change in a frequency that offers the maximum Brillouin gain (peak frequency) in the longitudinal direction, and thus to expand the Brillouin spectrum width for the whole transmission line of the optical fiber (see, for example, Patent Document 1, Non-Patent Document 2). However, this related art technique inevitably changes optical characteristics of the optical fiber in the longitudinal direction, which is not favorable from a practical point of view.

On the other hand, the Brillouin spectrum is sometimes represented, in other expressions, as a sum of overlaps between a spatial expansion of acoustic phonon mode(s) that interact and a spatial power distribution of the optical mode, by Formulas (4), (5) below (see, for example, Non-Patent Document 3):

$$S(v) = \sum_i S_i(v) \tag{4}$$

$$S_i(v) = G_i^2 \frac{\Gamma_i}{2\pi^2 \left[ (v - v_0 + f_i)^2 + \left(\frac{\Gamma_i}{2\pi}\right)^2 \right]} \tag{5}$$

where: S1(v) is a Brillouin gain at a frequency of v in each acoustic mode; i is the number of each acoustic mode; v0 is a peak frequency; fi is an acoustic frequency in each acoustic mode; and $\Gamma$i is an acoustic wave attenuation coefficient (the reciprocal of the attenuation relaxation time). $G_i$ is obtained by Formula (6) below:

$$G_i = p_{12} \omega_0 \beta_i \int_0^\infty X^2(r) \cdot Y_{zi}(r) \cdot r dr \tag{6}$$

where: p12 is the photoelasticity coefficient of Pockels; $\omega$0 is an angular frequency of the incident light; and $\beta$i is a propagation constant of each acoustic mode. Furthermore, X(r) and Yzi(r) are the electric field distribution of the propagation light in the optical fiber and the variation distribution of vibration in each acoustic mode in the z-axis direction, respectively. Here, S(v) (=S(v0)) at the peak frequency corresponds to gB0 in Formula (3).

The present inventors have found that according to Formula (4) to Formula (6), reducing G1, that is, reducing the distribution overlap between the electric field distribution of the propagation light and the variation distribution of vibration in each acoustic mode in the z-axis direction leads to a smaller Brillouin gain (=larger threshold power).

Thus, the present inventors devoted themselves to consideration of specific methods for reducing the above-mentioned overlap. Hereunder are the consideration results.

Figure 2:
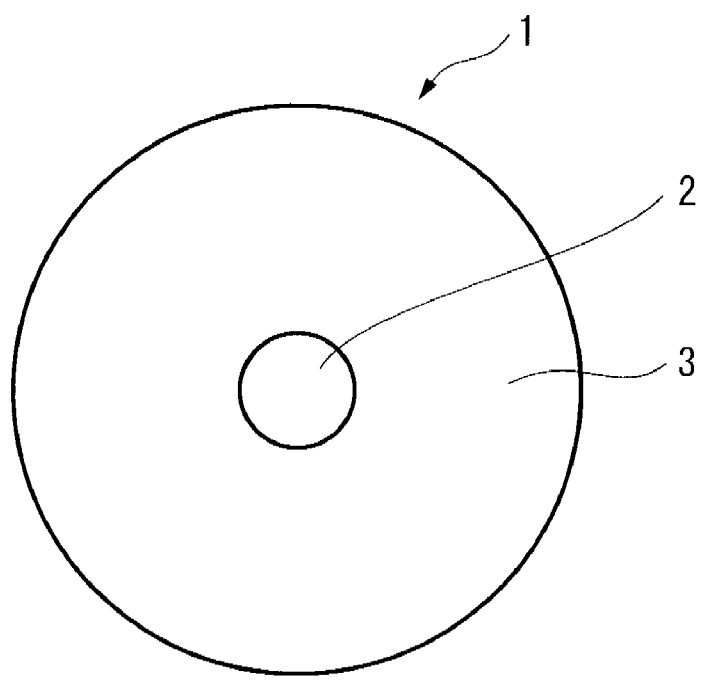
FIG. 2 is an end elevational view showing a configuration of an optical fiber.

FIG. 2 shows an example of a configuration of an existing optical fiber. The optical fiber 1 is composed of: a core 2 made of a silica glass with a high refractive index; and a cladding 3 provided around the periphery thereof. A dopant (e.g. germanium) is added to the core 2 for increasing the refractive index. The cladding 3 is not subjected to the intentional addition of a dopant. As shown in FIG. 2, the optical fiber 1 has a concentric configuration, in which the refractive index of the central core 2 is higher relative to that of the cladding 3. Light propagates along the core 2 while being enclosed therein.

On the other hand, the acoustic mode relating to SBS also propagates along the optical fiber. For an acoustic wave, addition of a foreign element to the silica glass also has an effect of slowing down the velocity of sound (enclosing the acoustic wave). Therefore, in the configuration shown in FIG. 2, the acoustic wave propagates along the core 2 while being enclosed therein.

Figure 3:
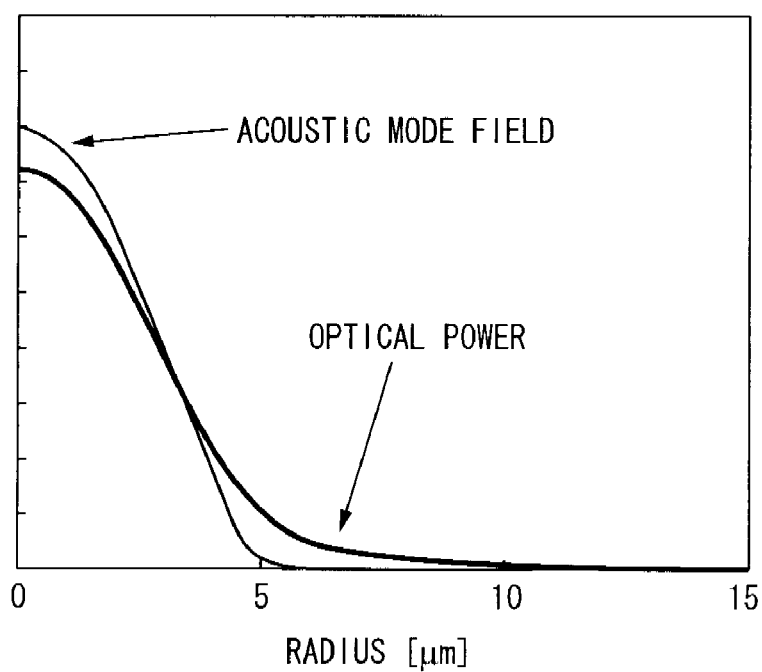
FIG. 3 is a graph showing the degree of an overlap between a light power distribution and an acoustic mode field distribution.

FIG. 3 is an example of calculation results showing the variation distribution (field distribution) of the acoustic mode and the optical power distribution (square law profile of the electrical field distribution) in the case of the configuration of FIG. 2. As shown here, in the conventional optical fiber in which reduction in SBS is not especially intended, the acoustic mode field distribution and the optical power distribution has substantially the same distribution pattern.

Figure 4A:
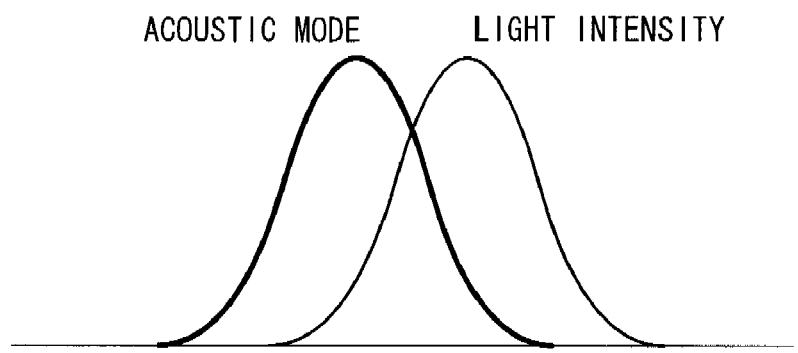
FIG. 4A is an example of distributions of a light power and an acoustic mode field that achieve SBS suppression.
Figure 4B:
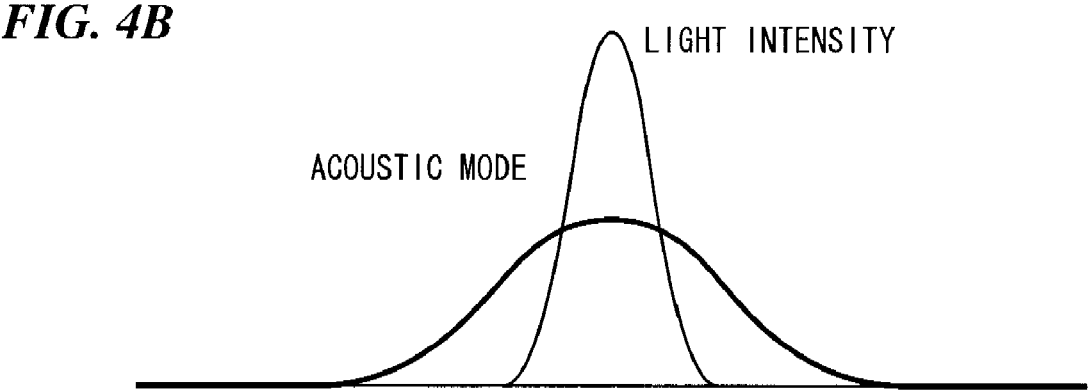
FIG. 4B is another example of distributions of a light power and an acoustic mode field that achieve SBS suppression.
Figure 4C:
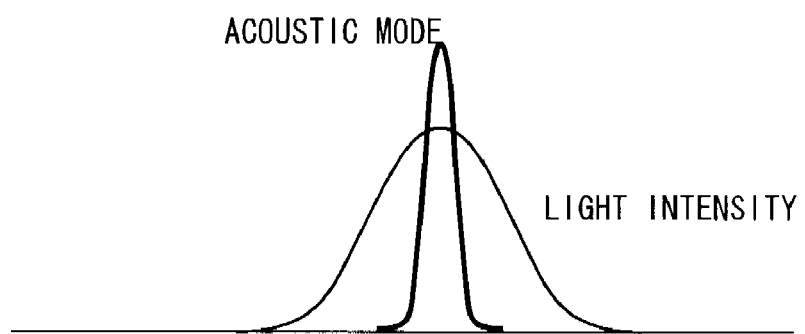
FIG. 4C is another example of distributions of a light power and an acoustic mode field that achieve SBS suppression.

To reduce the overlap between the acoustic field distribution and the optical power distribution, methods as shown in FIGS. 4A to 4B are conceived in which: (a) the center of the acoustic field distribution and the center of the optical power distribution are displaced from each other (see FIG. 4A); (b) the acoustic field distribution is made wider than the optical power distribution (see FIG. 4B); or (c) the optical power distribution is made wider than the acoustic field distribution.

As for the method (a), however, the configuration of the optical fiber as shown in FIG. 2 forces the distribution of the acoustic mode and the distribution of the optical power to be concentric. Thus, it is difficult to actualize.

Therefore, the techniques (b) and (c) can reduce the overlap between the acoustic field distribution and the optical power distribution, and can achieve suppression of SBS and an increase in the SBS threshold power.

For a more detailed description, expansion of the field distribution will be defined. As an index for a spatial expansion of a distribution that has a maximum value at its center such as an optical fiber, a so-called field diameter is used. Different technical fields have different definitions of the field diameter. In the field of optical fiber, a mode field diameter (MFD) defined by Petermann II is generally used. However, in the present invention, the field diameter is defined as a diameter of a spatial distribution of light intensity with 1/e of the peak power (hereinafter referred to as an optical MFD).

The reason for not using the general MFD is that as is seen in Formula (6), a direct distribution on which an overlap integral is performed is the square of the mode field distribution X, i.e., the optical power distribution, and thus it facilitates an intuitive understanding in comparison with the acoustic mode distribution.

On the other hand, as for the mode field diameter relating to the acoustic mode, the MFD is defined as a diameter that is 1/e of the peak variation (hereinafter referred to as acoustic MFD).

According to these definitions, the optical MFD and the acoustic MFD in the case shown in FIG. 3 are calculated as 7.5 μm and 7.1 μm, respectively.

Figure 5:
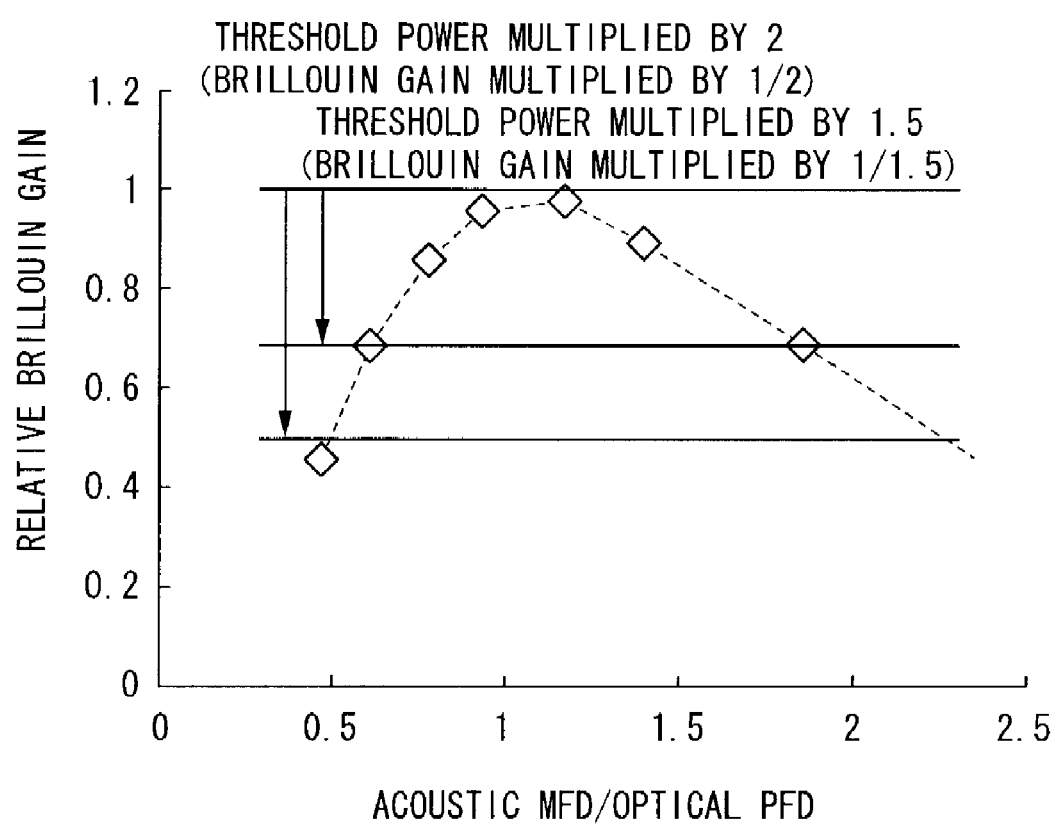
FIG. 5 is a graph showing a relation between a Brillouin gain and a relative value between an acoustic MFD and an optical MFD.

FIG. 5 shows a simulation example of the change in the Brillouin gain when the acoustic MFD is changed with the optical MFD being fixed. Here, to improve the threshold power by 1.5 or more times (i.e. to make the Brillouin gain 1/1.5 times larger), it can be seen that the acoustic MFD may be made about 1.6 or more times than or 2/3 or less than the optical MFD. Furthermore, it can be determined, also from FIG. 5, that to improve the threshold power by two or more times (=to make the Brillouin gain ½ times larger), the acoustic MFD may be made about 2.2 or more times than or ½ or less the optical MFD. Here, the optical MFD is fixed. However, also when the optical MFD is changed, the relation of FIG. 5 is derived as long as a relative relation between the optical MFD and the acoustic MFD is satisfied.

It may be desirable that only the acoustic MFD be changed to achieve suppression of SBS. This is because the present invention is directed to an optical fiber, and hence optical characteristics of an optical fiber include various performance requirements other than SBS. To achieve the SBS suppression while satisfying these performance requirements, the acoustic MFD may be changed without changing the optical MFD.

Typically, the optical MFD according to the present definition of the optical fiber for use in information communication is about 6 to 10 μm at a frequency of about 1550 nm. Therefore, in an optical fiber with this optical MFD, the acoustic MFD may be made 10 μm or more, or 6 μm or less to achieve the acoustic MFD of 1.6 or more times than or 2/3 or less the optical MFD.

As for means to make the acoustic MFD 1.6 or more times than or 2/3 or less the optical MFD, for example, methods for making a refractive index profile or a dopant concentration distribution of the core more complex, adding a plurality of dopants to the core to change the concentration distribution thereof in the radial direction, and adding a dopant to the cladding can be listed.

Next, a transmission system according to the present invention will be described.

An advantage of using the above-described optical fiber of the present invention is that a signal light with higher power can be introduced. Therefore, performing an analog transmission, baseband transmission, or optical SCM transmission that requires comparatively high power by use of the optical fiber of the present invention enables a longer-distance transmission with of more branches, and thus great benefits can be obtained. Especially in a system with a transmission distance of 15 km or longer and/or 32 branches or more, the greatest benefits can be obtained.

Furthermore, by use of an optical fiber according to the present invention, wavelength division multiplexing can also be performed in which another transmission can be performed simultaneously with the above-described analog transmission, baseband transmission, or optical SCM transmission. As for wavelength division multiplexing, one form of FTTH shown in ITU-T G.983.3, CWDM, or the like can be conceived.

Obviously, there is no need to limit the optical fiber of the present invention to these applications in a transmission system. For example, it can be used not only in a typical public data communication, but also in a digital, long-distance relay-free transmission system, an ITS, a sensor, a remote laser cutting system, etc.

Finally, in this embodiment, the acoustic mode has been described as that in the dominant mode. In actuality, the acoustic mode is not necessarily in a single mode, but a plurality of modes may be present. However, even so, since the mode of light is the dominant mode, the acoustic mode with the largest overlap in Formula (6) is the dominant mode in most cases. Therefore, it is to be noted that when SBS suppression is considered, regarding only the dominant mode of the acoustic mode as the dominant mode generally poses no problem.

The related art embodiment shown in FIG. 2 and FIG. 3 will be described in more detail.

Figure 6:
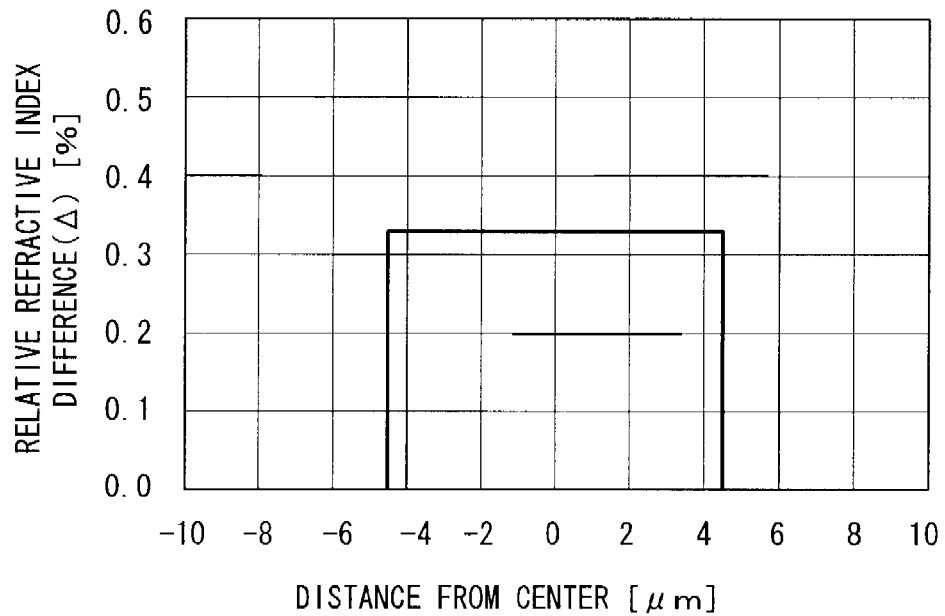
FIG. 6 is a graph showing an example of a refractive index profile of a related art optical fiber.
Figure 7:
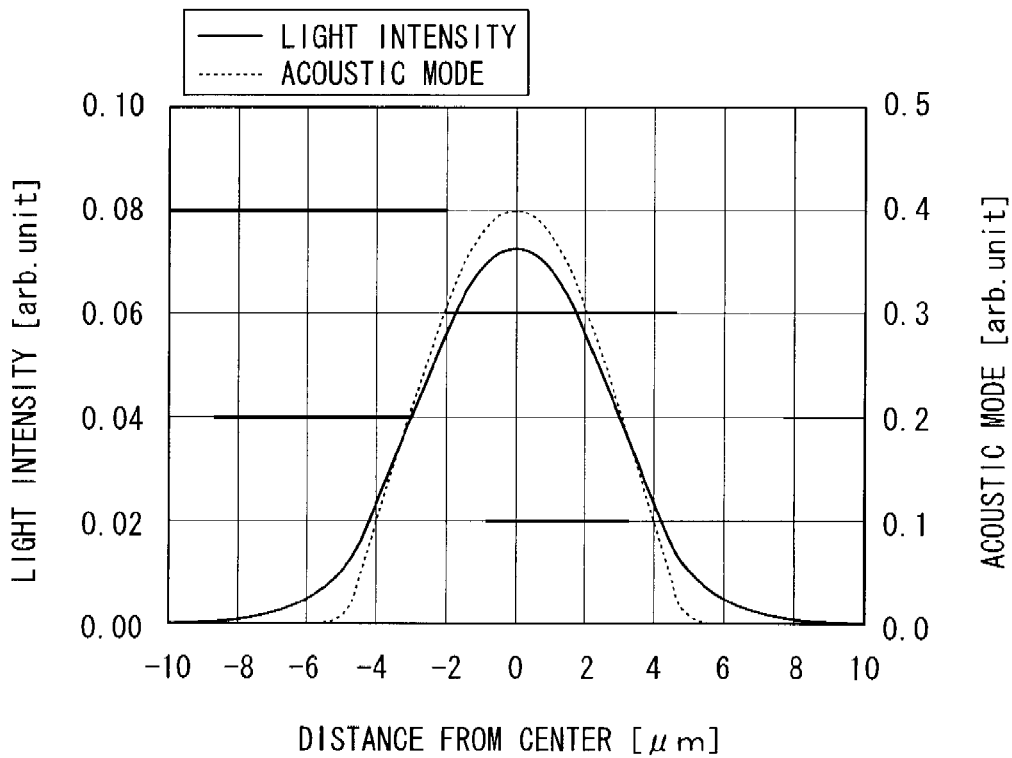
FIG. 7 is a graph showing distributions of a light intensity and an acoustic mode of the optical fiber of FIG. 6.

FIG. 6 is an example of a related art refractive index profile. By use of such a refractive index profile, characteristics as shown below can be obtained. FIG. 7 shows the distributions of the optical power and the acoustic mode of this related art embodiment.

The fiber cut-off wavelength is 1.27 μm.
The cable cut-off wavelength is 1.21 μm.
The mode field diameter (Petermann II) is 9.43 μm at a wavelength of 1310 nm and 10.57 μm at a wavelength of 1550 nm.
The zero-dispersion wavelength is 1307.0 nm.
The wavelength dispersion value is 0.26 ps/nm/km at a wavelength of 1310 nm and 17.43 ps/nm/km at a wavelength of 1550 nm.
The bending loss at a bending diameter of 20 mm is 1.0 dB/m at a wavelength of 1310 nm and 19.7 dB/m at a wavelength of 1550 nm.
The optical MFD is 7.60 μm at a wavelength of 1550 nm.
The acoustic MFD is 7.10 μm.

Figure 8:
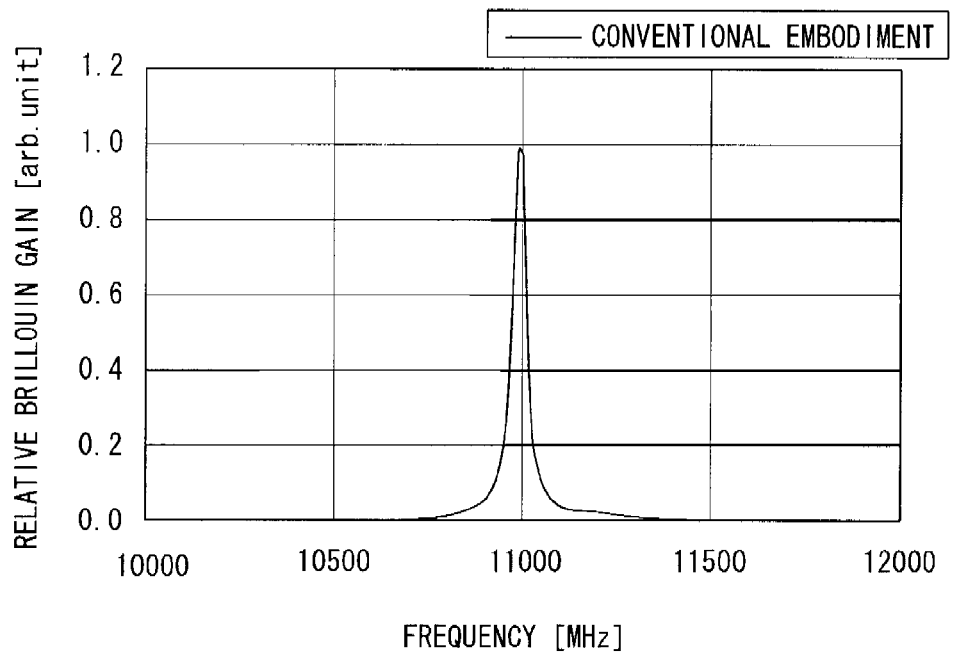
FIG. 8 is a graph showing a Brillouin spectrum of the optical fiber of FIG. 6.

This related art embodiment has characteristics of a general single-mode optical fiber defined in IUT-T G.652. The value of (Acoustic MFD)/(Optical MFD) was 0.93. FIG. 8 shows the Brillouin spectrum of the optical fiber of this conventional embodiment. As shown in FIG. 8, a Brillouin spectrum with a single peak was measured.

Figure 9:
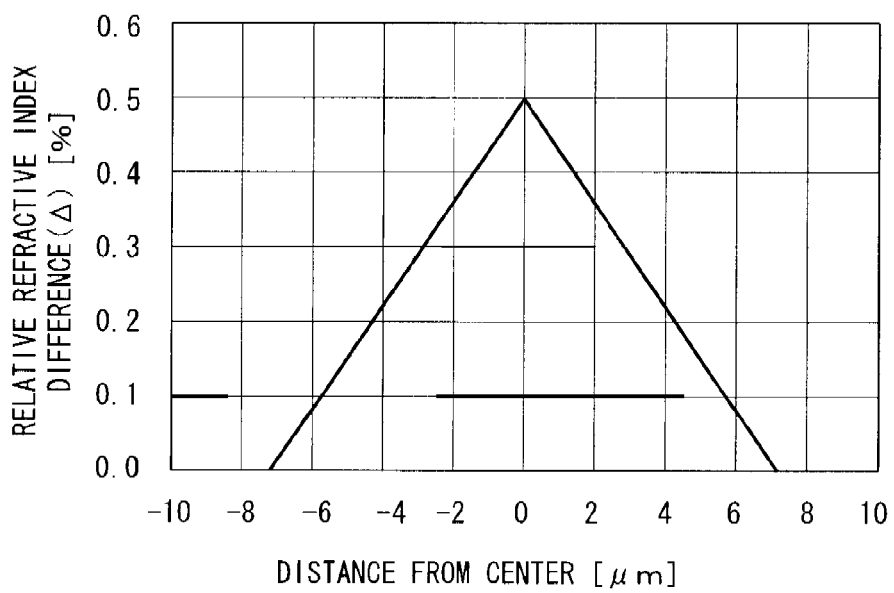
FIG. 9 is a graph showing a refractive index profile of an optical fiber of a first embodiment.
Figure 10:
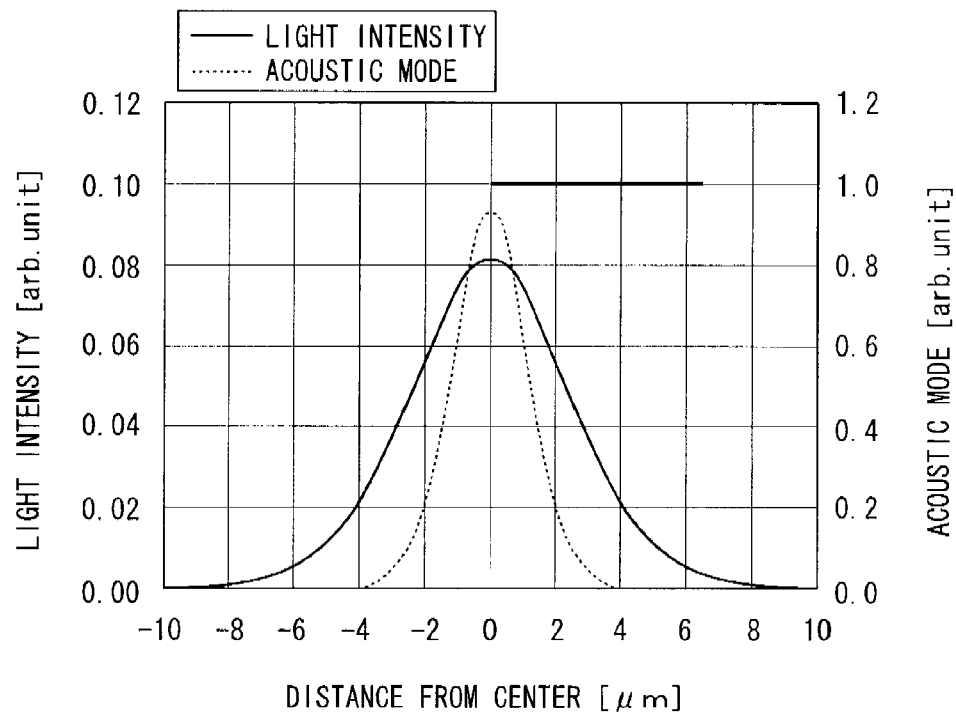
FIG. 10 is a graph showing distributions of a light intensity and an acoustic mode of the optical fiber of the first embodiment.

FIG. 9 shows the refractive index profile of a first exemplary embodiment. An optical fiber of the first embodiment has a profile in which the refractive index is maximum near the center and decreases with a substantially fixed gradient with respect to the radius. Optical characteristics of the optical fiber with the refractive index shown in FIG. 9 will be shown below. FIG. 10 shows the distributions of the optical power and the acoustic mode of this embodiment.

The fiber cut-off wavelength is 1.25 μm.
The cable cut-off wavelength is 1.20 μm.
The mode field diameter (Petermann II) is 9.46 μm at a wavelength of 1310 nm and 10.86 μm at a wavelength of 1550 nm.
The zero-dispersion wavelength is 1330.5 nm.
The wavelength dispersion value is −1.90 ps/nm/km at a wavelength of 1310 nm and 16.27 ps/nm/km at a wavelength of 1550 nm.
The bending loss at a bending diameter of 20 mm is 2.6 dB/m at a wavelength of 1310 nm and 39.5 dB/m at a wavelength of 1550 nm.
The optical MFD is 6.76 μm at a wavelength of 1550 nm.
The acoustic MFD is 3.18 μm.

Figure 11:
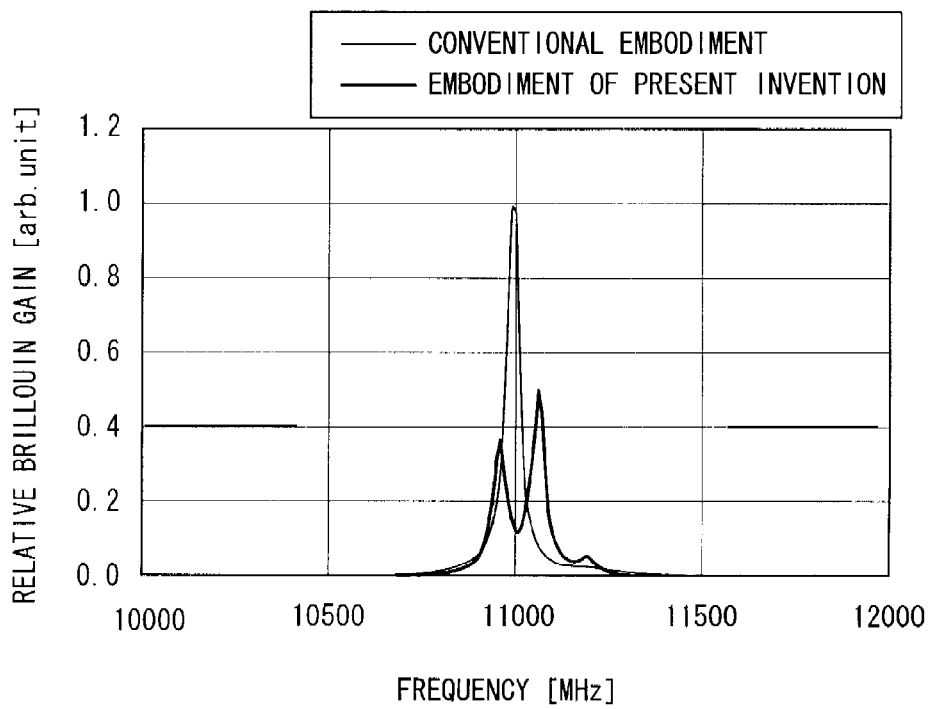
FIG. 11 is a graph showing a Brillouin spectrum of the optical fiber of the first embodiment.

The value of (Acoustic MFD)/(Optical MFD) of the optical fiber of this embodiment is 0.47, which is about half that of the related art embodiment. It can also be seen from FIG. 10 that the expansion of the acoustic mode is narrower than that of the optical power. FIG. 11 shows a Brillouin spectrum of the optical fiber of this embodiment. It is seen from FIG. 11 that the peak of the spectrum is reduced to about half. The SBS threshold power measured was improved by 3.0 dB over that of the related art embodiment.

Figure 12:
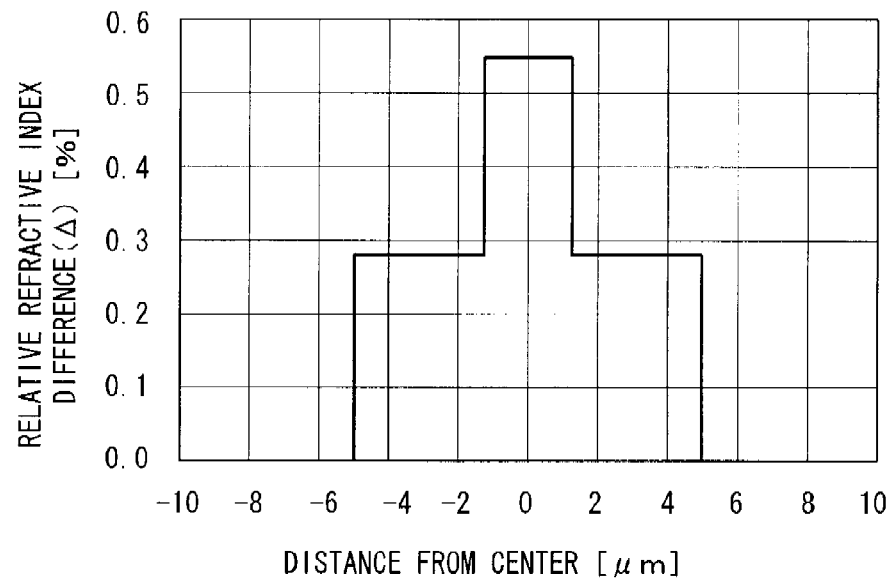
FIG. 12 is a graph showing a refractive index profile of an optical fiber of a second embodiment.
Figure 13:
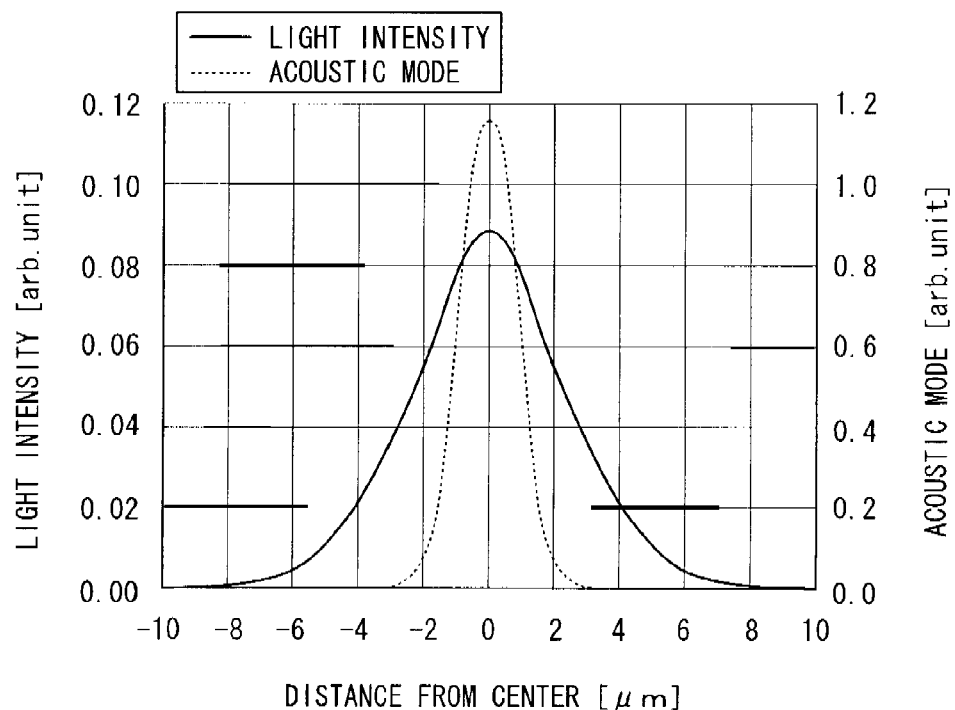
FIG. 13 is a graph showing distributions of a light intensity and an acoustic mode of the optical fiber of the second embodiment.

FIG. 12 shows the refractive index profile of a second exemplary embodiment. The optical fiber of the second embodiment has a refractive index profile of a core with two layers. Optical characteristics of the optical fiber with the refractive index shown in FIG. 12 will be shown below. FIG. 13 shows the distributions of the optical power and the acoustic mode of this embodiment.

The fiber cut-off wavelength is 1.29 μm.
The cable cut-off wavelength is 1.22 μm.
The mode field diameter (Petermann II) is 9.27 μm at a wavelength of 1310 nm and 10.53 μm at a wavelength of 1550 nm.
The zero-dispersion wavelength is 1326.3 nm.
The wavelength dispersion value is −1.55 ps/nm/km at a wavelength of 1310 nm and 16.77 ps/nm/km at a wavelength of 1550 nm.
The bending loss at a bending diameter of 20 mm is 0.5 dB/m at a wavelength of 1310 nm and 12.8 dB/m at a wavelength of 1550 nm.
The optical MFD is 6.59 μm at a wavelength of 1550 nm.
The acoustic MFD is 2.49 μm.

Figure 14:
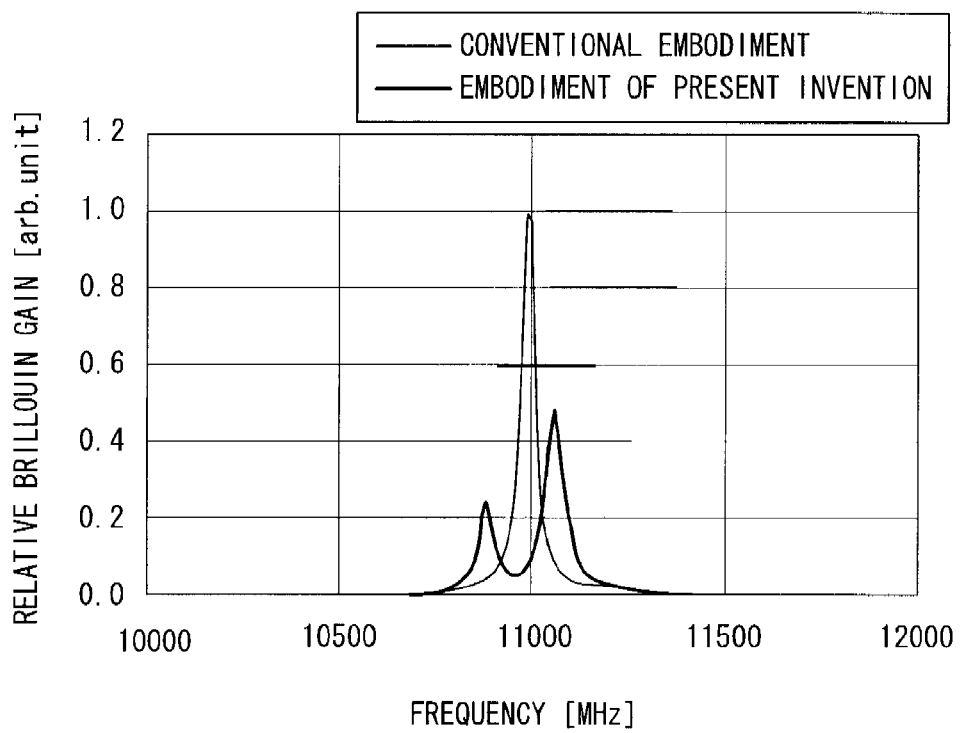
FIG. 14 is a graph showing a Brillouin spectrum of the optical fiber of the second embodiment.

The value of (Acoustic MFD)/(Optical MFD) of the optical fiber of this embodiment is 0.38, which is about half that of the related art embodiment. It can also be seen from FIG. 13 that the expansion of the acoustic mode is narrower than that of the optical power. FIG. 14 shows a Brillouin spectrum of the optical fiber of this embodiment. It is seen from FIG. 14 that the peak of the spectrum is reduced to about half The SBS threshold power measured was improved by 3.2 dB over that of the related art embodiment.

Figure 15:
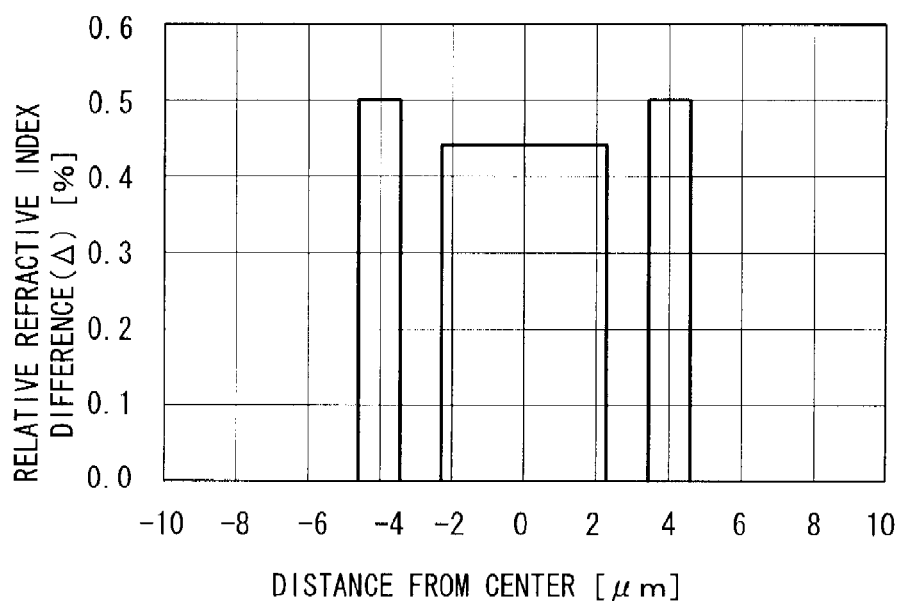
FIG. 15 is a graph showing a refractive index profile of an optical fiber of a third embodiment.
Figure 16:
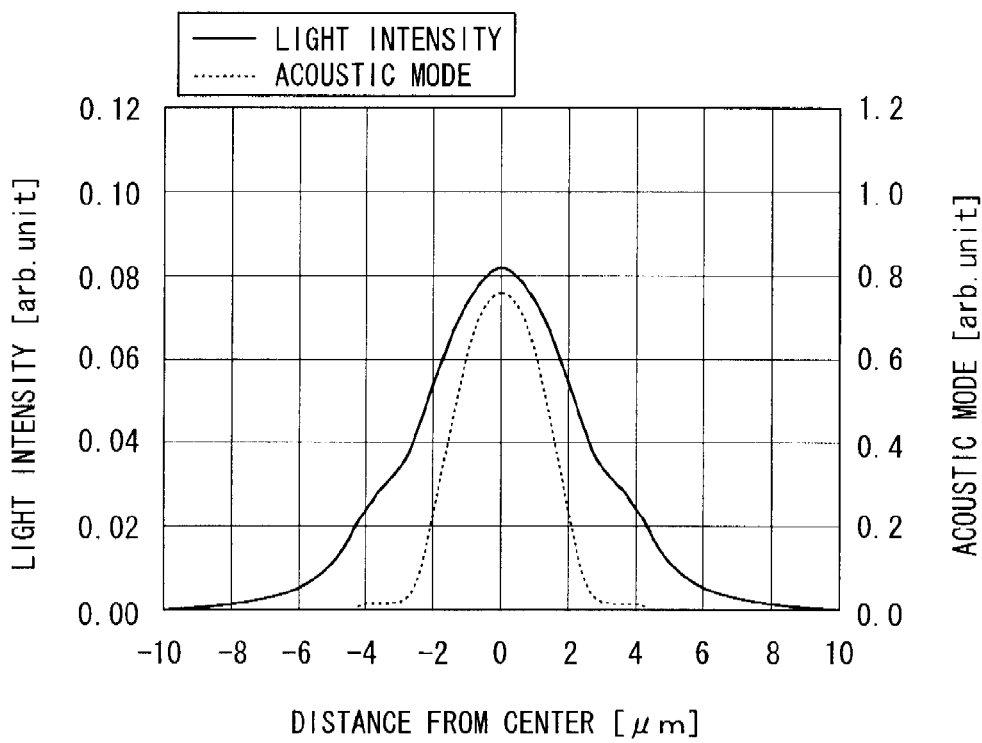
FIG. 16 is a graph showing distributions of a light intensity and an acoustic mode of the optical fiber of the third embodiment.

FIG. 15 shows the refractive index profile of a third exemplary embodiment. The optical fiber of the third embodiment has a refractive index profile of a core with two layers. Optical characteristics of the optical fiber with the refractive index shown in FIG. 15 will be shown below. FIG. 16 shows the distributions of the optical power and the acoustic mode of this embodiment.

The fiber cut-off wavelength is 1.26 μm.
The cable cut-off wavelength is 1.20 μm.
The mode field diameter (Petermann II) is 9.31 μm at a wavelength of 1310 nm and 10.70 μm at a wavelength of 1550 nm.
The zero-dispersion wavelength is 1335.3 nm.
The wavelength dispersion value is −2.43 ps/nm/km at a wavelength of 1310 nm and 16.14 ps/nm/km at a wavelength of 1550 nm.
The bending loss at a bending diameter of 20 mm is 2.1 dB/m at a wavelength of 1310 nm and 34.8 dB/m at a wavelength of 1550 nm.
The optical MFD is 6.83 μm at a wavelength of 1550 nm.
The acoustic MFD is 3.81 μm.

Figure 17:
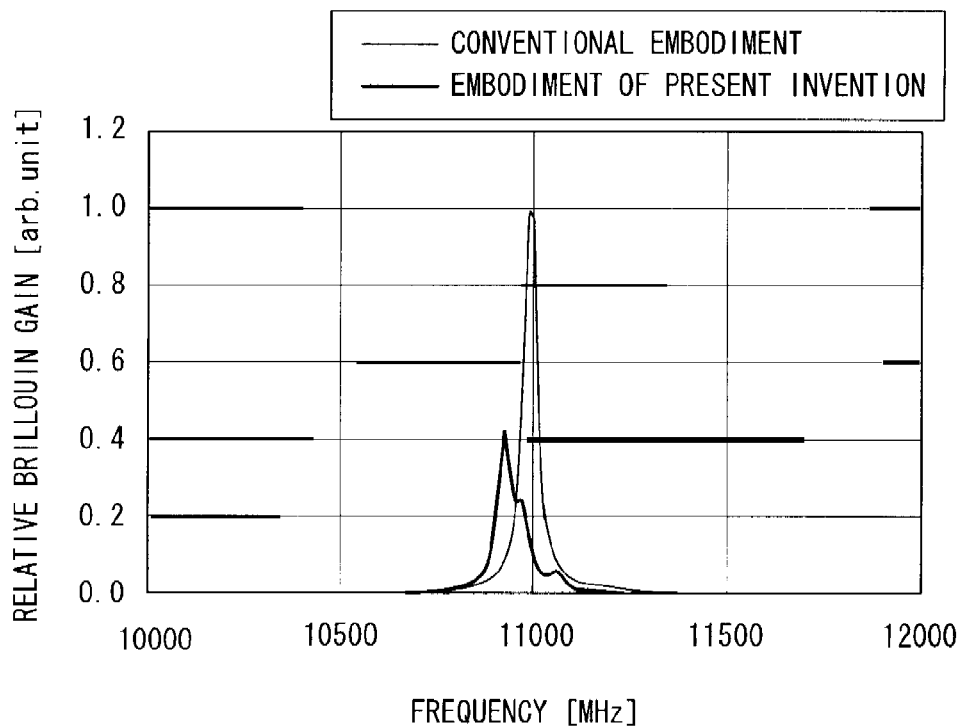
FIG. 17 is a graph showing a Brillouin spectrum of the optical fiber of the third embodiment.

The value of (Acoustic MFD)/(Optical MFD) of the optical fiber of this embodiment is 0.56, which is about half that of the related art embodiment. It can also be seen from FIG. 16 that the expansion of the acoustic mode is narrower than that of the optical power. FIG. 17 shows a Brillouin spectrum of the optical fiber of this embodiment. It is seen from FIG. 17 that the peak of the spectrum is reduced to about half. The SBS threshold power measured was improved by 3.7 dB over that of the related art embodiment.

Figure 18:
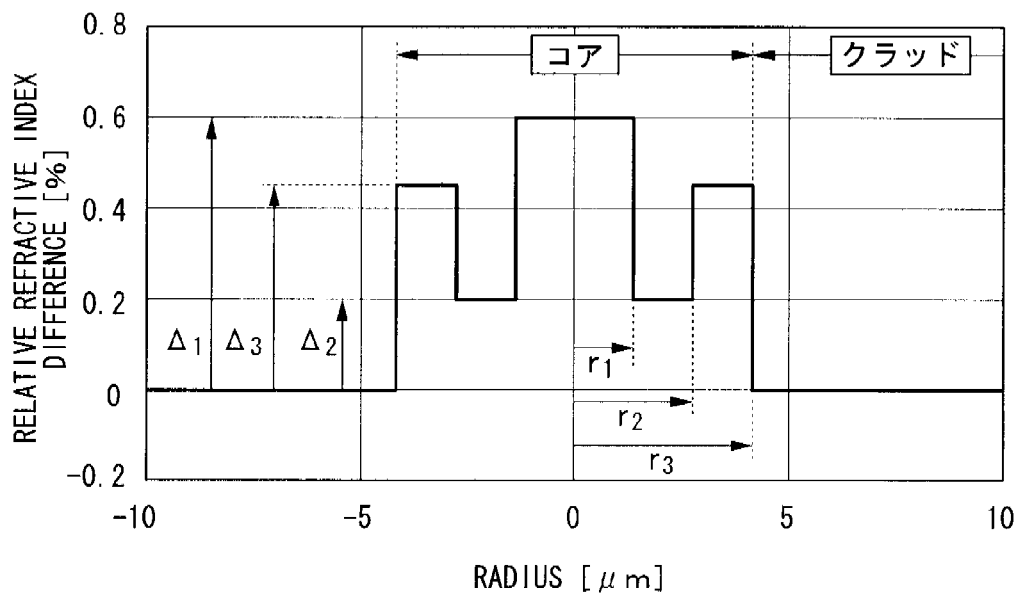
FIG. 18 is a graph showing a refractive index profile of an optical fiber of a fourth embodiment.
Figure 19:
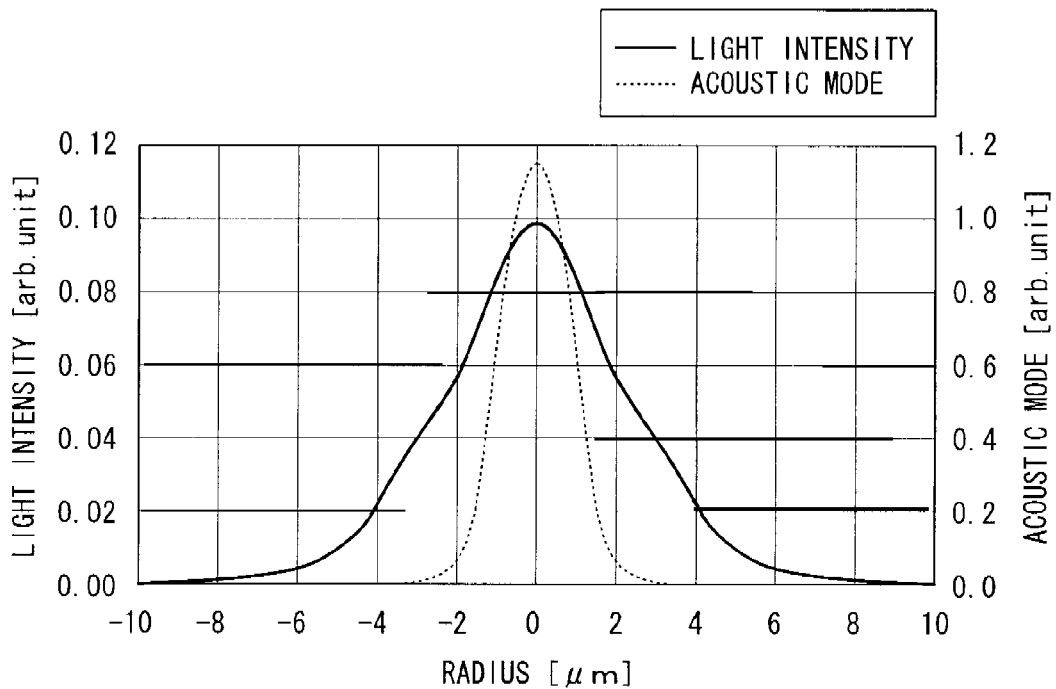
FIG. 19 is a graph showing distributions of a light intensity and an acoustic mode of the optical fiber of the fourth embodiment.

FIG. 18 shows the refractive index profile of a fourth exemplary embodiment. FIG. 18 is an enlarged view of the profile in the vicinity of the core. In the refractive index profile of FIG. 18, a cladding radius is 62.5 μm. An optical fiber of the fourth embodiment is composed of a three-layered core and a cladding with a substantially fixed refractive index profile. Table 1 shows configuration parameters (radius and relative refractive index difference of each layer) and optical characteristics of this configuration. FIG. 19 shows the distributions of the optical power and the acoustic mode of this embodiment.

TABLE 1

$r_1$: 1.38 μm, $\Delta_1$: 0.60%
$r_2$: 2.76 μm, $\Delta_2$: 0.20%
$r_3$: 4.15 μm, $\Delta_3$: 0.45%

| | |
|---|---|
| Fiber cut-off wavelength | 1280 nm |
| Cable cut-off wavelength | 1220 nm |
| Mode field diameter (Petermann II) | |
| at 1310 nm | 8.64 μm |
| at 1550 nm | 9.85 μm |
| Zero-dispersion wavelength | 1335.4 nm |
| Chromatic dispersion value | |
| at 1310 nm | −2.31 ps/nm/km |
| at 1550 nm | 17.73 ps/nm/km |
| Bending loss | |
| at a diameter of 20 mm, 1310 nm | 0.06 dB/m |
| at a diameter of 20 mm, 1550 nm | 2.65 dB/m |
| Optical MFD at 1550 nm | 6.48 μm |
| Acoustic MFD | 2.54 μm |

Figure 20:
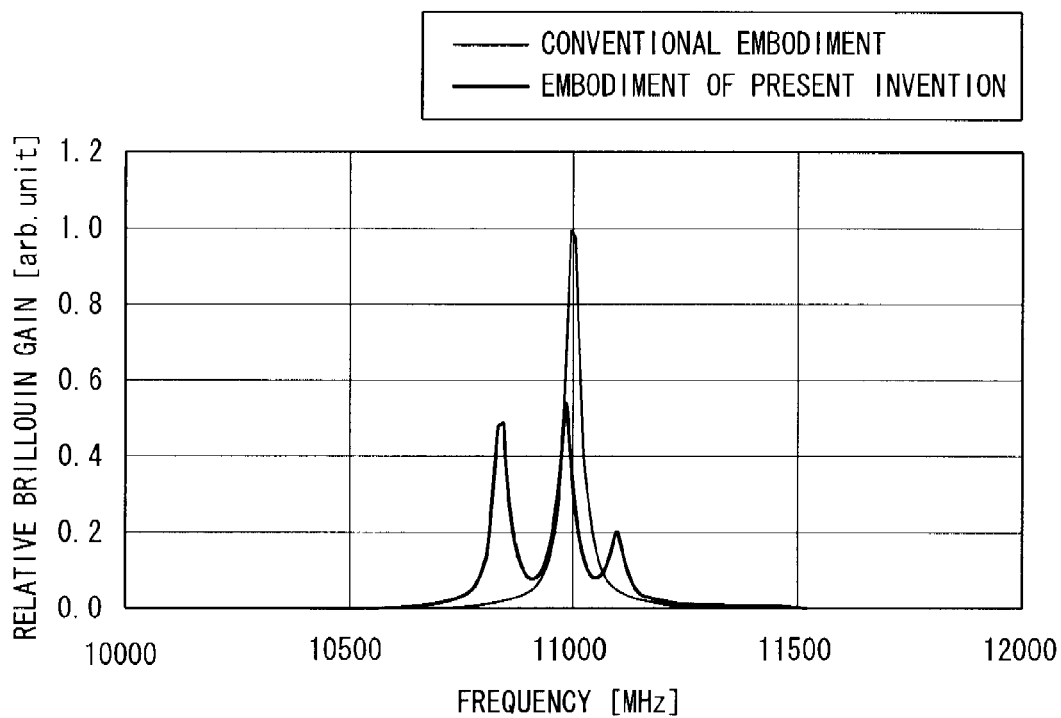
FIG. 20 is a graph showing a Brillouin spectrum of the optical fiber of the fourth embodiment.

The optical fiber of this embodiment has an MFD smaller than the optical fiber of the related art embodiment. However, according to Formula (1), the SBS threshold power Pth is proportional to the effective cross section Aeff. Furthermore, Aeff is proportional to MFD2. In other words, generally, as the MFD becomes smaller, the smaller the SBS threshold power becomes. However, in the optical fiber of this embodiment, as is seen from FIG. 19, the expansion of the acoustic mode is narrower than that of the optical power, and the value of (Acoustic MFD)/(Optical MFD) is 0.37, which is about half that of the related art embodiment. FIG. 20 shows a Brillouin spectrum of the optical fiber of this embodiment. The maximum peak in the vicinity of 10980 MHz is reduced to about half that of the conventional embodiment. Furthermore, there is a peak in the vicinity of 10830 MHz, about as high as the maximum peak. Therefore, it is effective in improving the SBS threshold power. The SBS threshold power measured was 12.9 dBm in the optical fiber with a length of 20 km. Thus, an improvement by 4.2 dB over the related art fiber was confirmed.

Figure 21:
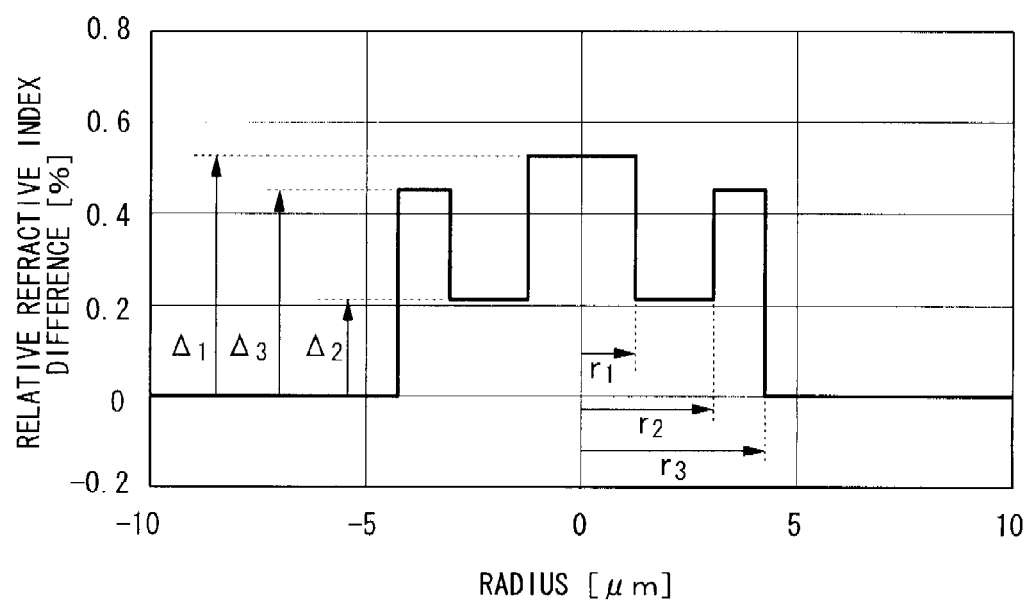
FIG. 21 is a graph showing a refractive index profile of an optical fiber of a fifth embodiment.
Figure 22:
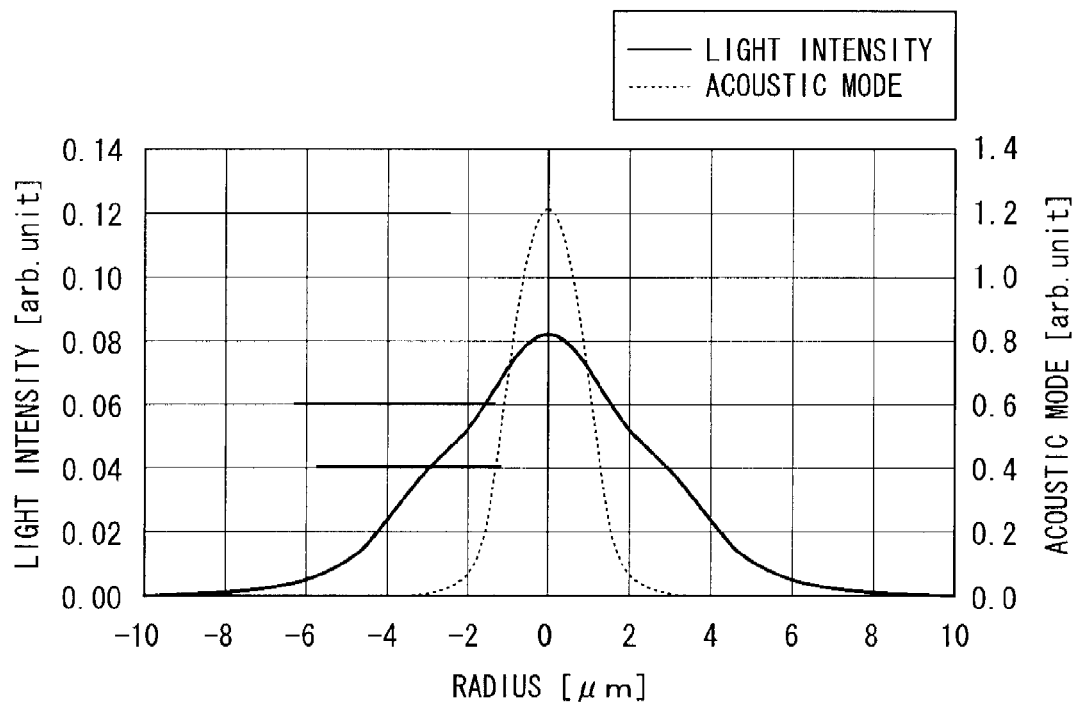
FIG. 22 is a graph showing distributions of a light intensity and an acoustic mode of the optical fiber of the fifth embodiment.

FIG. 21 shows the refractive index profile of a fifth exemplary embodiment. FIG. 21 is an enlarged view of the profile in the vicinity of the core. In the refractive index profile of FIG. 21, a cladding radius is 62.5 μm. An optical fiber of the fifth embodiment is composed of a three-layered core and a cladding with a substantially fixed refractive index profile. Table 2 shows configuration parameters (radius and relative refractive index difference of each layer) and optical characteristics of this configuration. FIG. 22 shows the distributions of the optical power and the acoustic mode of this embodiment. The zero-dispersion wavelength is 1318.4 nm, which satisfies ITU-T G.652.

TABLE 2

$r_1$: 1.22 μm, $\Delta_1$: 0.53%
$r_2$: 3.05 μm, $\Delta_2$: 0.22%
$r_3$: 4.27 μm, $\Delta_3$: 0.45%

| | |
|---|---|
| Fiber cut-off wavelength | 1290 nm |
| Cable cut-off wavelength | 1225 nm |
| Mode field diameter (Petermann II) | |
| at 1310 nm | 9.30 μm |
| at 1550 nm | 10.52 μm |
| Zero-dispersion wavelength | 1318.4 nm |
| Chromatic dispersion value | |
| at 1310 nm | −0.77 ps/nm/km |
| at 1550 nm | 16.84 ps/nm/km |
| Bending loss | |
| at a diameter of 20 mm, 1310 nm | 0.51 dB/m |
| at a diameter of 20 mm, 1550 nm | 10.0 dB/m |
| Optical MFD at 1550 nm | 7.25 μm |
| Acoustic MFD | 2.38 μm |

Figure 23:
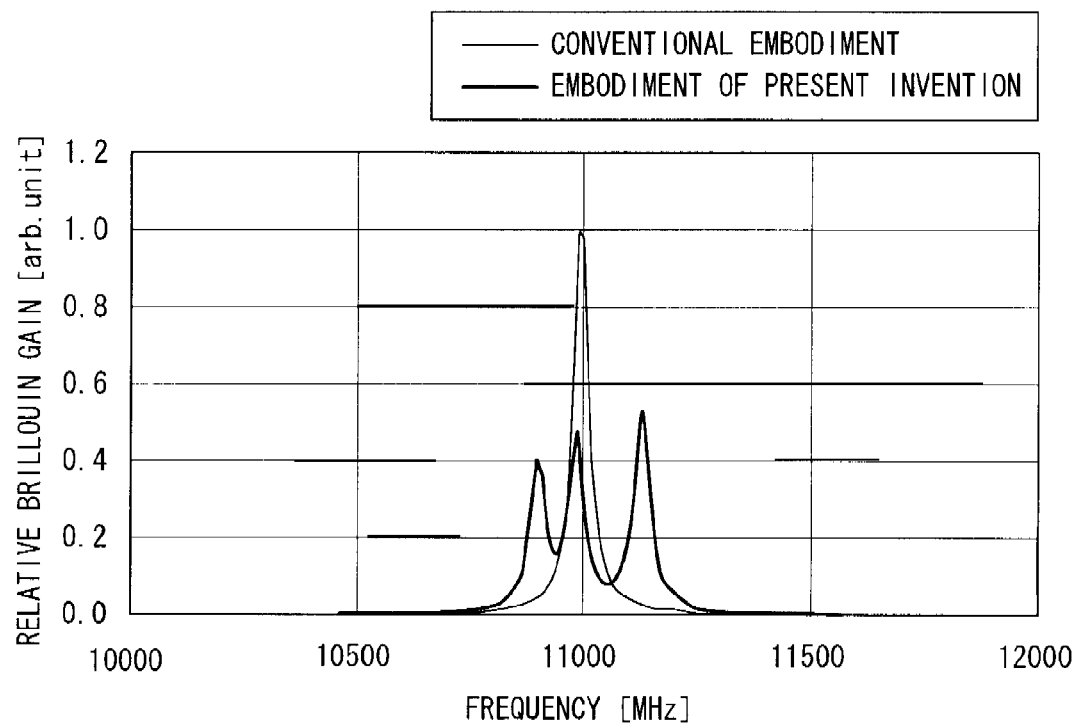
FIG. 23 is a graph showing a Brillouin spectrum of the optical fiber of the fifth embodiment.

The optical fiber of this embodiment has about the same MFD as the optical fiber of the related art embodiment. In the optical fiber of this embodiment, as is seen from FIG. 22, the expansion of the acoustic mode is narrower than that of the optical power. The value of (Acoustic MFD)/(Optical MFD) is 0.33, which is about half that of the related art embodiment. FIG. 23 shows a Brillouin spectrum of the optical fiber of this embodiment. The maximum peak in the vicinity of 11130 MHz is reduced to about half that of the related art embodiment. Furthermore, there are peaks in the vicinity of 10900 and 10990 MHz, about as high as the maximum peak. Therefore, it is effective in improving the SBS threshold power. The SBS threshold power measured was 13.4 dBm in the optical fiber with a length of 20 km. Thus, an improvement by 4.7 dB over the related art fiber was confirmed.

Figure 24:
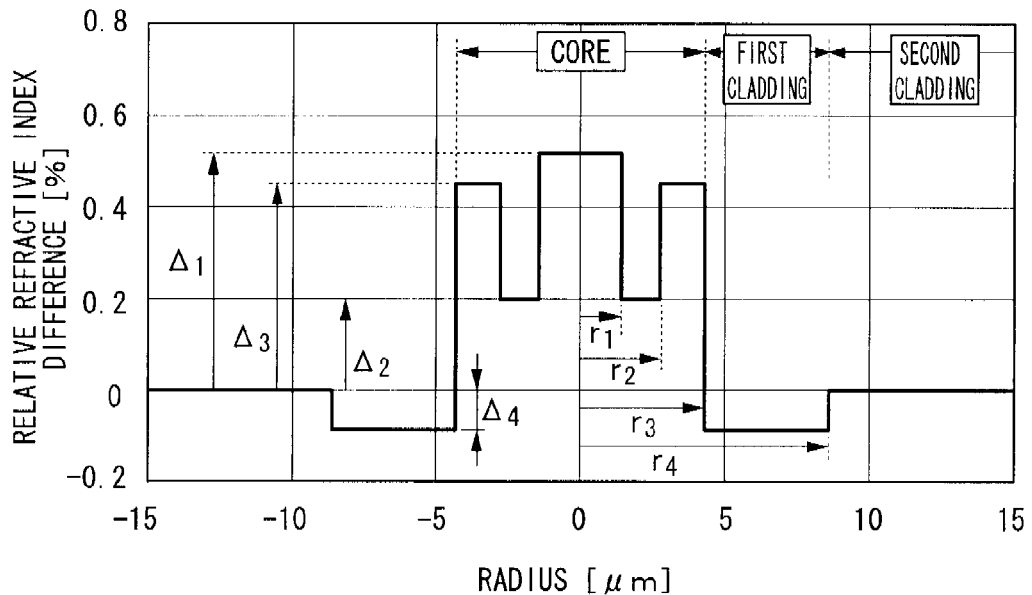
FIG. 24 is a graph showing a refractive index profile of an optical fiber of a sixth embodiment.
Figure 25:
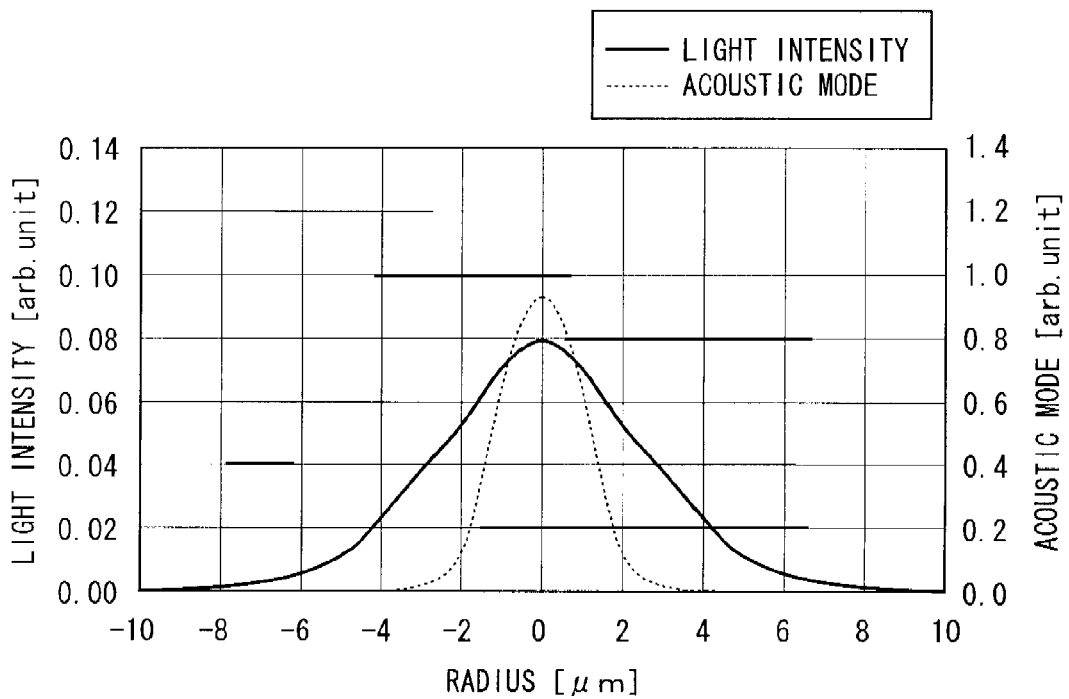
FIG. 25 is a graph showing distributions of a light intensity and an acoustic mode of the optical fiber of the sixth embodiment.

FIG. 24 shows the refractive index profile of a sixth exemplary embodiment. FIG. 24 is an enlarged view of the profile in the vicinity of the core. In the refractive index profile of FIG. 24, a cladding radius is 62.5 μm. An optical fiber of the sixth embodiment is composed of a three-layered core and a cladding with a substantially fixed refractive index profile. Table 3 shows configuration parameters (radius and relative refractive index difference of each layer) and optical characteristics of this configuration. FIG. 25 shows the distributions of the optical power and the acoustic mode of this embodiment. The zero-dispersion wavelength is 1314.0 nm, which satisfies ITU-T G.652.

TABLE 3

$r_1$: 1.45 μm, $\Delta_1$: 0.52%
$r_2$: 2.90 μm, $\Delta_2$: 0.20%
$r_3$: 4.35 μm, $\Delta_3$: 0.45%
$r_4$: 8.70 μm, $\Delta_4$: −0.08%

| | |
|---|---|
| Fiber cut-off wavelength | 1275 nm |
| Cable cut-off wavelength | 1210 nm |
| Mode field diameter (Petermann II) | |
| at 1310 nm | 8.63 μm |
| at 1550 nm | 9.66 μm |
| Zero-dispersion wavelength | 1314.0 nm |
| chromatic dispersion value | |
| at 1310 nm | −0.37 ps/nm/km |
| at 1550 nm | 16.78 ps/nm/km |
| Bending loss | |
| at a diameter of 20 mm, 1310 nm | 0.15 dB/m |
| at a diameter of 20 mm, 1550 nm | 5.0 dB/m |

TABLE 3-continued

| $r_1$: 1.45 μm, $\Delta_1$: 0.52% |
| $r_2$: 2.90 μm, $\Delta_2$: 0.20% |
| $r_3$: 4.35 μm, $\Delta_3$: 0.45% |
| $r_4$: 8.70 μm, $\Delta_4$: −0.08% |

| | |
|---|---|
| Optical MFD at 1550 nm | 6.83 μm |
| Acoustic MFD | 2.70 μm |

Figure 26:
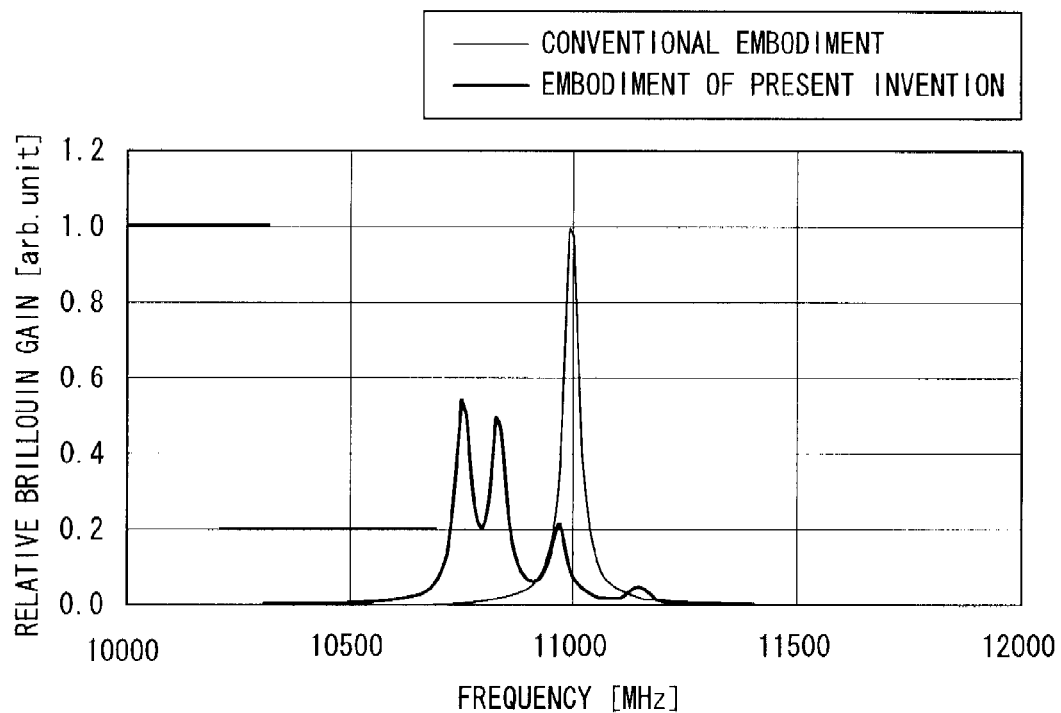
FIG. 26 is a graph showing a Brillouin spectrum of the optical fiber of the sixth embodiment.

The optical fiber of this embodiment has an MFD smaller than the optical fiber of the related art embodiment. As is the case with the fourth embodiment, in the related art configuration, the MFD of the fiber of this embodiment would be expected to cause the SBS threshold power to be degraded. However, in the optical fiber of this embodiment, as is seen from FIG. 25, the expansion of the acoustic mode is narrower than that of the optical power, and the value of (Acoustic MFD)/(Optical MFD) is 0.39, which is about half that of the conventional embodiment. FIG. 26 shows a Brillouin spectrum of the optical fiber of this embodiment. The maximum peak in the vicinity of 10750 MHz is reduced to about half that of the conventional embodiment. Furthermore, there is a peak in the vicinity of 10830 MHz, about as high as the maximum peak. Therefore, it is effective in improving the SBS threshold power. The SBS threshold power measured was 13.0 dBm in the optical fiber with a length of 20 km. Thus, an improvement by 4.3 dB over the related art fiber was confirmed.

Figure 27:
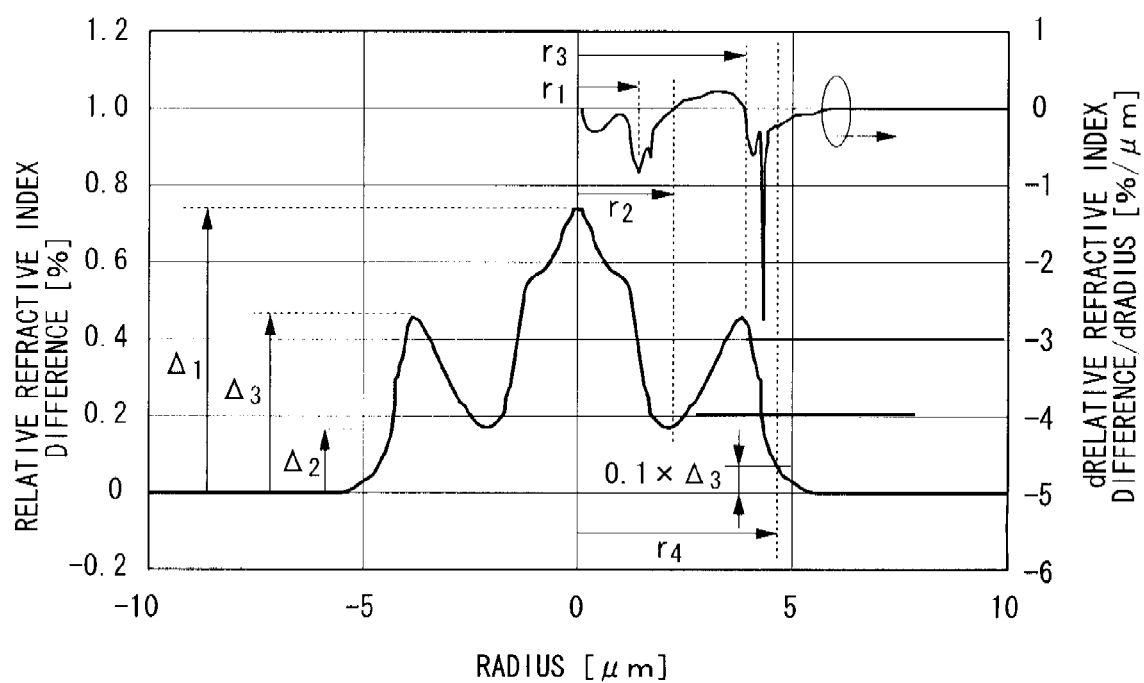
FIG. 27 is a graph showing a refractive index profile of an optical fiber of a seventh embodiment.
Figure 28:
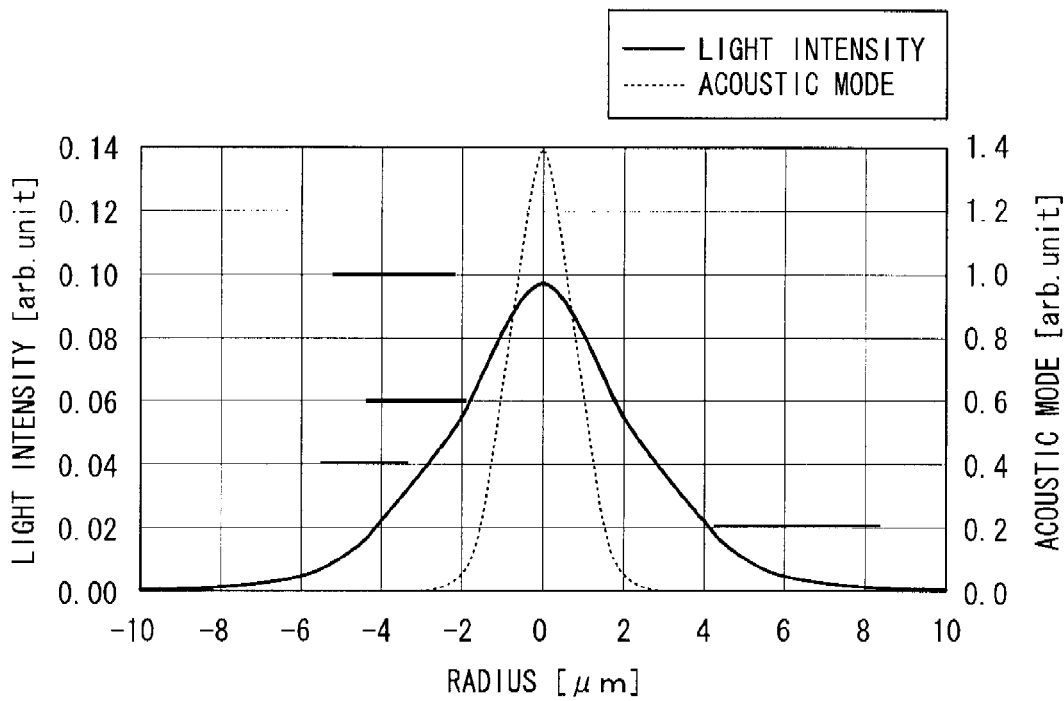
FIG. 28 is a graph showing distributions of a light intensity and an acoustic mode of the optical fiber of the seventh embodiment.

FIG. 27 shows the refractive index profile of a seventh exemplary embodiment. FIG. 27 is an enlarged view of the profile in the vicinity of the core. In the refractive index profile of FIG. 27, a cladding radius is 62.5 μm. An optical fiber of the seventh embodiment includes a central core with a maximum relative refractive index difference $\Delta 1$, a second core adjacent to the central core, with a minimum relative refractive index difference $\Delta 2$, and a third core adjacent to the second core, with a maximum relative refractive index difference $\Delta 3$. Thus, it is composed of the three-layered core and a cladding with a substantially fixed refractive index profile, as in the third to sixth embodiments. However, the optical fiber of this embodiment has, unlike the third to sixth embodiments, a curvy refractive index profile, with borders between the refractive indexes being relatively ambiguous. Here, the diameter for each layer is defined by a rate of change in the relative refractive index difference in the radial direction (d relative refractive index difference/d radius). In the core region, points at which the rate of change is zero are made the radiuses of the second and third cores r2, r3, respectively. The radius, shorter than r2, at which the rate of change is minimum is made the radius r1 of the central core. Table 4 shows configuration parameters (radius and relative refractive index difference of each layer) and optical characteristics of this configuration. FIG. 28 shows the distributions of the optical power and the acoustic mode of this embodiment.

TABLE 4

| $r_1$: 1.44 μm, $\Delta_1$: 0.76% |
| $r_2$: 2.29 μm, $\Delta_2$: 0.17% |
| $r_3$: 3.94 μm, $\Delta_3$: 0.46% |
| $r_4$: 4.85 μm |

| | |
|---|---|
| Fiber cut-off wavelength | 1260 nm |
| Cable cut-off wavelength | 1206 nm |
| Mode field diameter (Petermann II) | |
| at 1310 nm | 8.84 μm |
| at 1550 nm | 10.12 μm |
| Zero-dispersion wavelength | 1338.8 nm |

TABLE 4-continued

| $r_1$: 1.44 μm, $\Delta_1$: 0.76% |
| $r_2$: 2.29 μm, $\Delta_2$: 0.17% |
| $r_3$: 3.94 μm, $\Delta_3$: 0.46% |
| $r_4$: 4.85 μm |

| | |
|---|---|
| chromatic dispersion value | |
| at 1310 nm | −2.71 ps/nm/km |
| at 1550 nm | 15.86 ps/nm/km |
| Bending loss | |
| at a diameter of 20 mm, 1310 nm | 0.13 dB/m |
| at a diameter of 20 mm, 1550 nm | 4.3 dB/m |
| Optical MFD at 1550 nm | 6.36 μm |
| Acoustic MFD | 2.21 μm |

Figure 29:
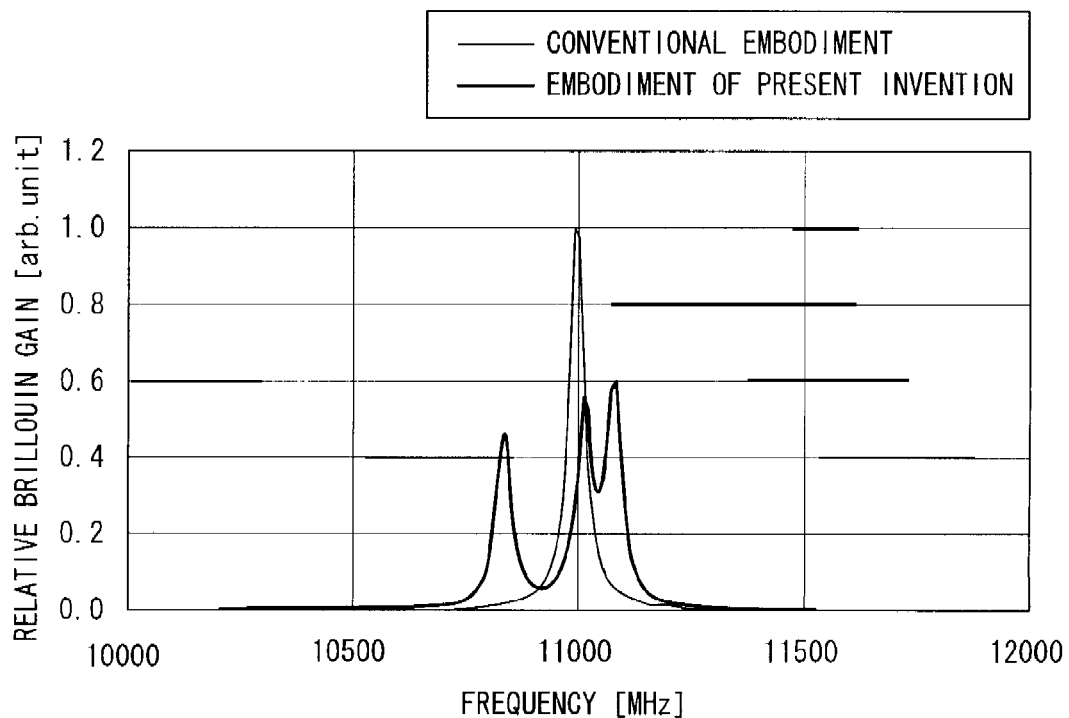
FIG. 29 is a graph showing a Brillouin spectrum of the optical fiber of the seventh embodiment.

The optical fiber of this embodiment has an MFD smaller than the optical fiber of the related art embodiment. As is the case with the fourth embodiment, in the related art configuration, the MFD of the fiber of this embodiment would be expected to cause the SBS threshold power to be degraded. However, in the optical fiber of this embodiment, as is seen from FIG. 28, the expansion of the acoustic mode is narrower than that of the optical power, and the value of (Acoustic MFD)/(Optical MFD) is 0.39, which is about half that of the related art embodiment. FIG. 29 shows a Brillouin spectrum of the optical fiber of this embodiment. The maximum peak in the vicinity of 11080 MHz is reduced to about half that of the related art embodiment. Furthermore, there are peaks in the vicinity of 11010 and 10840 MHz, about as high as the maximum peak. Therefore, it is effective in improving the SBS threshold power. The SBS threshold power measured was 13.5 dBm in the optical fiber with a length of 20 km. Thus, an improvement by 4.8 dB over the related art fiber was confirmed.

Figure 30:
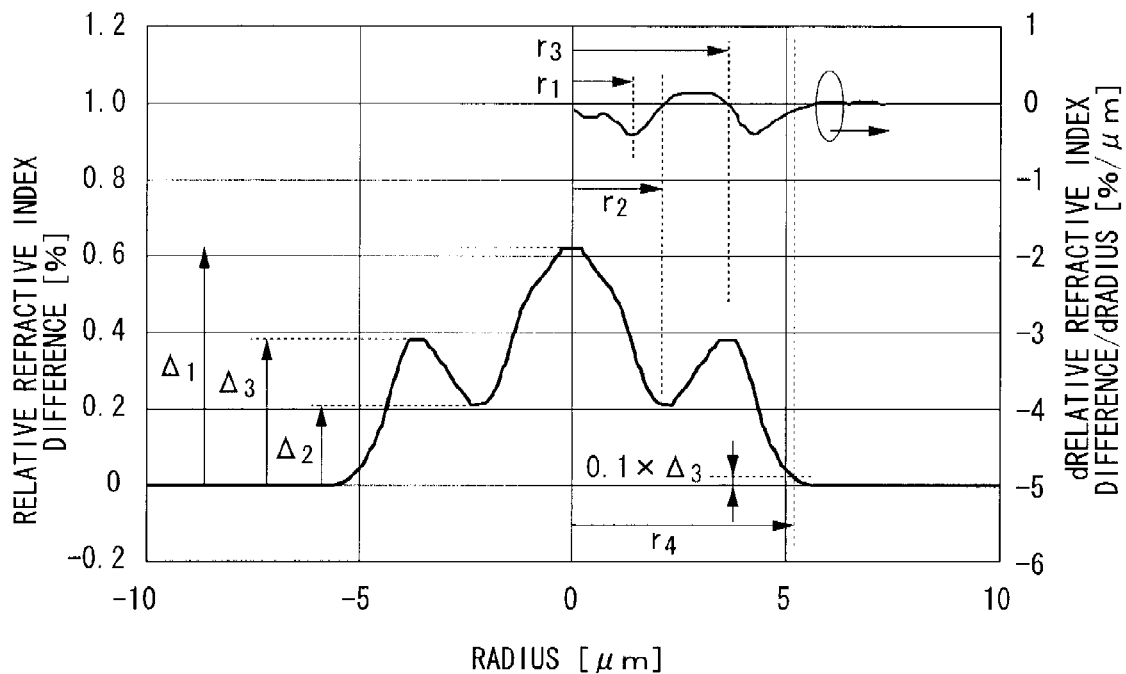
FIG. 30 is a graph showing a refractive index profile of an optical fiber of an eighth embodiment.
Figure 31:
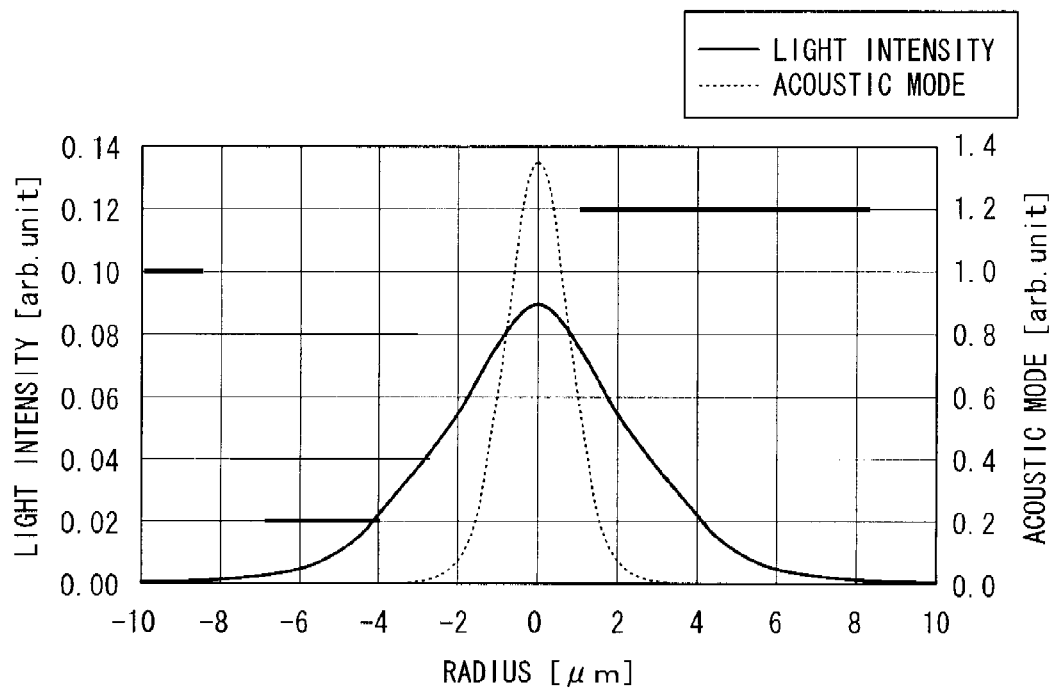
FIG. 31 is a graph showing distributions of a light intensity and an acoustic mode of the optical fiber of the eighth embodiment.

FIG. 30 shows the refractive index profile of an eighth exemplary embodiment. FIG. 30 is an enlarged view of the profile in the vicinity of the core. In the refractive index profile of FIG. 30, a cladding radius is 62.5 μm. An optical fiber of the eighth embodiment includes a central core with a maximum relative refractive index difference $\Delta 1$, a second core adjacent to the central core, with a minimum relative refractive index difference $\Delta 2$, and a third core adjacent to the second core, with a maximum relative refractive index difference $\Delta 3$. Thus, it is composed of the three-layered core and a cladding with a substantially fixed refractive index profile, as in the third to sixth embodiments. However, the optical fiber of this embodiment has, unlike the third to sixth embodiments, a curvy refractive index profile. The definitions of the borders thereof are the same as in the seventh embodiment. Table 5 shows configuration parameters (radius and relative refractive index difference of each layer) and optical characteristics of this configuration. FIG. 31 shows the distributions of the optical power and the acoustic mode of this embodiment.

TABLE 5

| $r_1$: 1.40 μm, $\Delta_1$: 0.63% |
| $r_2$: 2.12 μm, $\Delta_2$: 0.22% |
| $r_3$: 3.63 μm, $\Delta_3$: 0.38% |
| $r_4$: 5.08 μm |

| | |
|---|---|
| Fiber cut-off wavelength | 1350 nm |
| Cable cut-off wavelength | 1250 nm |
| Mode field diameter (Petermann II) | |
| at 1310 nm | 9.15 μm |
| at 1550 nm | 10.39 μm |
| Zero-dispersion wavelength | 1326.8 nm |

TABLE 5-continued r₁: 1.40 μm, Δ₁: 0.63%
r₂: 2.12 μm, Δ₂: 0.22%
r₃: 3.63 μm, Δ₃: 0.38%
r₄: 5.08 μm

| chromatic dispersion value | |
|---|---|
| at 1310 nm | −1.54 ps/nm/km |
| at 1550 nm | 16.52 ps/nm/km |
| Bending loss | |
| at a diameter of 20 mm, 1310 nm | 0.06 dB/m |
| at a diameter of 20 mm, 1550 nm | 2.2 dB/m |
| Optical MFD at 1550 nm | 6.73 μm |
| Acoustic MFD | 2.22 μm |

Figure 32:
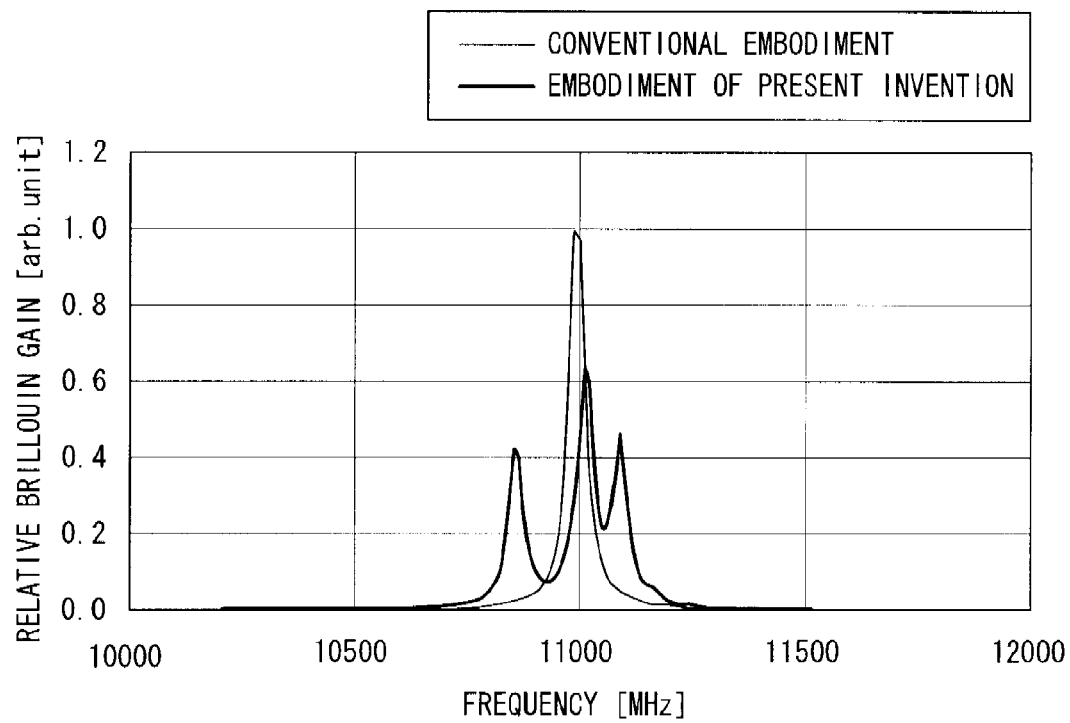
FIG. 32 is a graph showing a Brillouin spectrum of the optical fiber of the eighth embodiment.

The optical fiber of this embodiment has about the same MFD as the optical fiber of the related art embodiment. In the optical fiber of this embodiment, as is seen from FIG. 31, the expansion of the acoustic mode is narrower than that of the optical power. The value of (Acoustic MFD)/(Optical MFD) is 0.33, which is about half that of the related art embodiment. FIG. 32 shows a Brillouin spectrum of the optical fiber of this embodiment. The maximum peak in the vicinity of 11010 MHz is reduced to about half that of the related art embodiment. Furthermore, there are peaks in the vicinity of 10860 and 11090 MHz, about as high as the maximum peak. Therefore, it is effective in improving the SBS threshold power. The SBS threshold power measured was 12.6 dBm in the optical fiber with a length of 20 km. Thus, an improvement by 3.9 dB over the related art fiber was confirmed.

Figure 33:
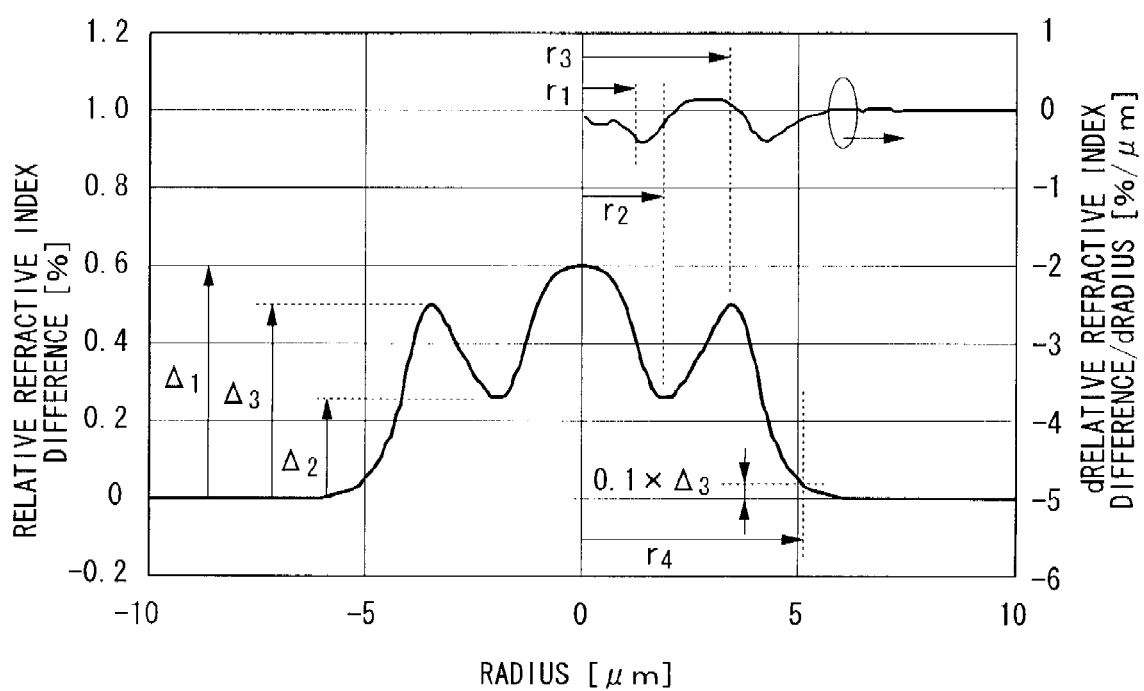
FIG. 33 is a graph showing a refractive index profile of an optical fiber of a ninth embodiment.
Figure 34:
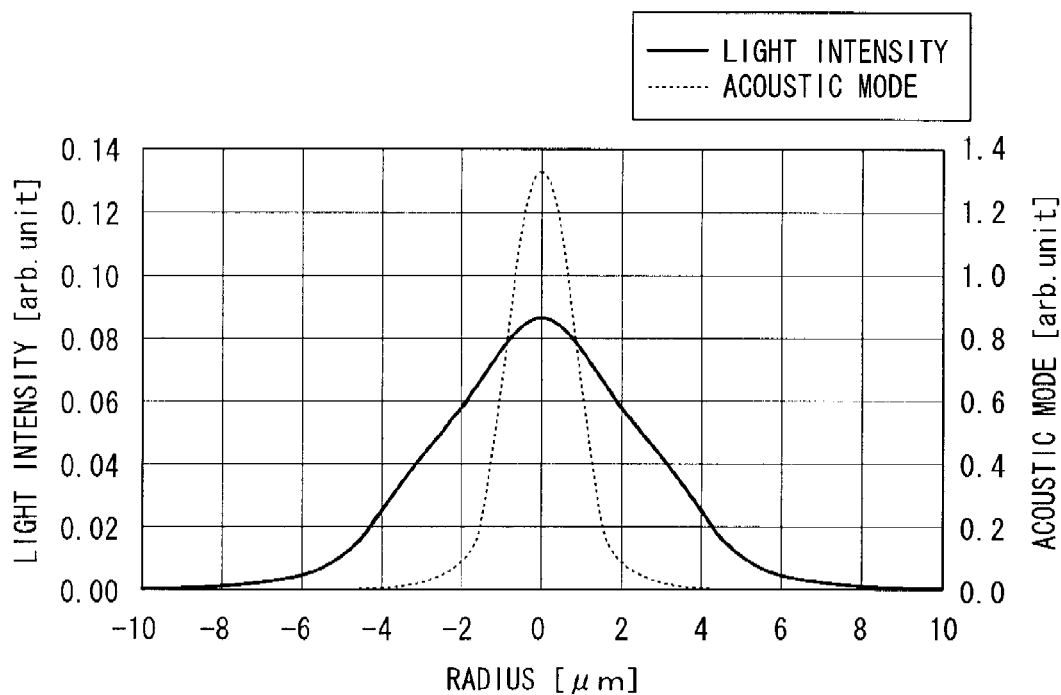
FIG. 34 is a graph showing distributions of a light intensity and an acoustic mode of the optical fiber of the ninth embodiment.

FIG. 33 shows the refractive index profile of a ninth exemplary embodiment. FIG. 33 is an enlarged view of the profile in the vicinity of the core. In the refractive index profile of FIG. 33, a cladding radius is 62.5 μm. An optical fiber of the ninth embodiment includes a central core with a maximum relative refractive index difference Δ1, a second core adjacent to the central core, with a minimum relative refractive index difference Δ2, and a third core adjacent to the second core, with a maximum relative refractive index difference Δ3. Thus, it is composed of the three-layered core and a cladding with a substantially fixed refractive index profile, as in the third to sixth embodiments. However, the optical fiber of this embodiment has, unlike the third to sixth embodiments, a curvy refractive index profile. The definitions of the borders thereof are the same as in the seventh embodiment. Table 6 shows configuration parameters (radius and relative refractive index difference of each layer) and optical characteristics of this configuration. FIG. 34 shows the distributions of the optical power and the acoustic mode of this embodiment. The zero-dispersion wavelength is 1314.5 nm, which satisfies ITU-T G.652.

TABLE 6 r₁: 1.31 μm, Δ₁: 0.60%
r₂: 1.92 μm, Δ₂: 0.26%
r₃: 3.38 μm, Δ₃: 0.50%
r₄: 5.02 μm

| Fiber cut-off wavelength | 1380 nm |
|---|---|
| Cable cut-off wavelength | 1260 nm |
| Mode field diameter (Petermann II) | |
| at 1310 nm | 9.02 μm |
| at 1550 nm | 10.10 μm |
| Zero-dispersion wavelength | 1314.5 nm |

TABLE 6-continued r₁: 1.31 μm, Δ₁: 0.60%
r₂: 1.92 μm, Δ₂: 0.26%
r₃: 3.38 μm, Δ₃: 0.50%
r₄: 5.02 μm

| Chromatic dispersion value | |
|---|---|
| at 1310 nm | −0.41 ps/nm/km |
| at 1550 nm | 17.15 ps/nm/km |
| Bending loss | |
| at a diameter of 20 mm, 1310 nm | <0.01 dB/m |
| at a diameter of 20 mm, 1550 nm | 0.4 dB/m |
| Optical MFD at 1550 nm | 7.00 μm |
| Acoustic MFD | 2.23 μm |

Figure 35:
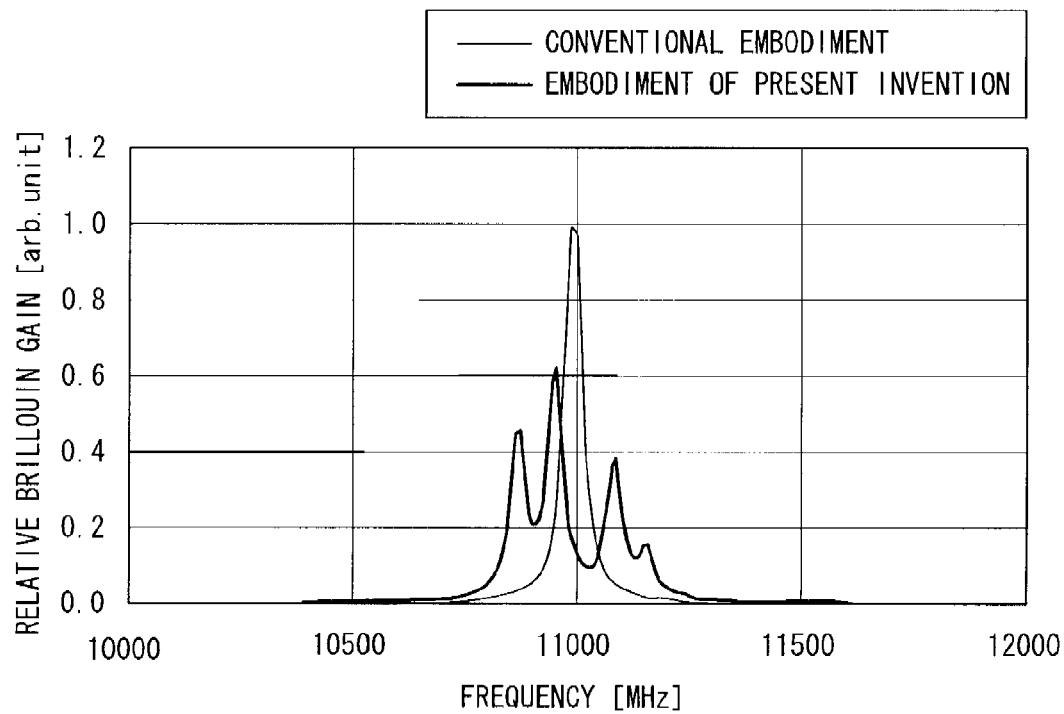
FIG. 35 is a graph showing a Brillouin spectrum of the optical fiber of the ninth embodiment.

The optical fiber of this embodiment has about the same MFD as the optical fiber of the related art embodiment. In the optical fiber of this embodiment, as is seen from FIG. 34, the expansion of the acoustic mode is narrower than that of the optical power. The value of (Acoustic MFD)/(Optical MFD) is 0.32, which is about half that of the related art embodiment. FIG. 35 shows a Brillouin spectrum of the optical fiber of this embodiment. The maximum peak in the vicinity of 10960 MHz is reduced to about half that of the related art embodiment. Furthermore, there are peaks present in the vicinity of 10870 and 11090 MHz, about as high as the maximum peak. Therefore, it is effective in improving the SBS threshold power. The SBS threshold power measured was 12.6 dBm in the optical fiber with a length of 20 km. Thus, an improvement by 3.9 dB over the related art fiber was confirmed.

Figure 36:
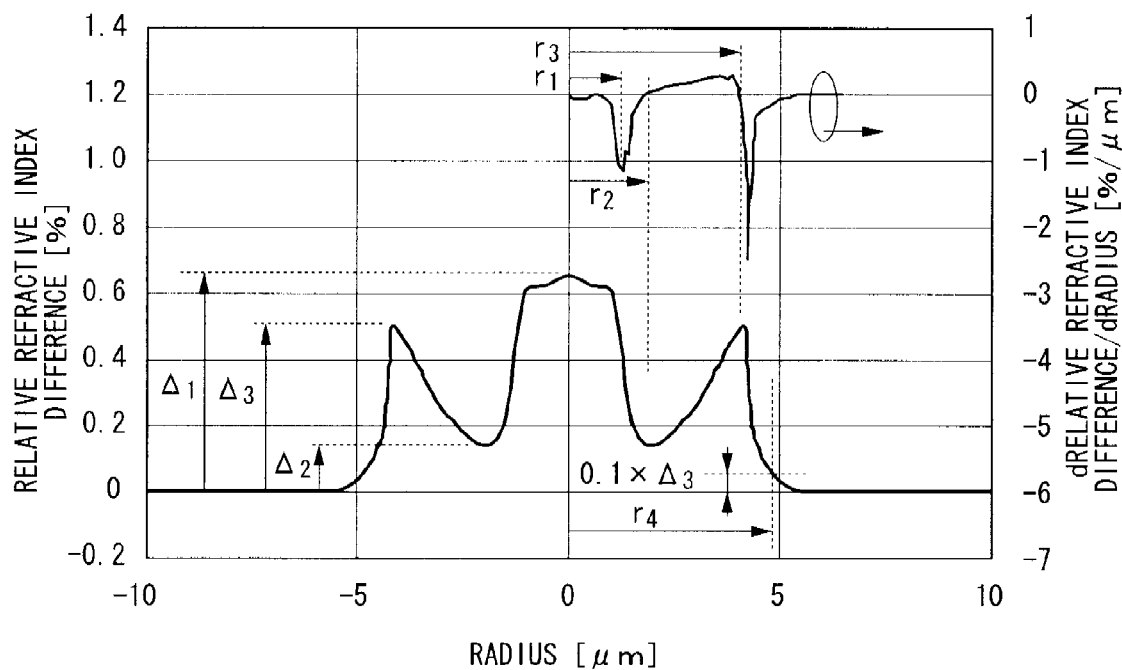
FIG. 36 is a graph showing a refractive index profile of an optical fiber of a tenth embodiment.
Figure 37:
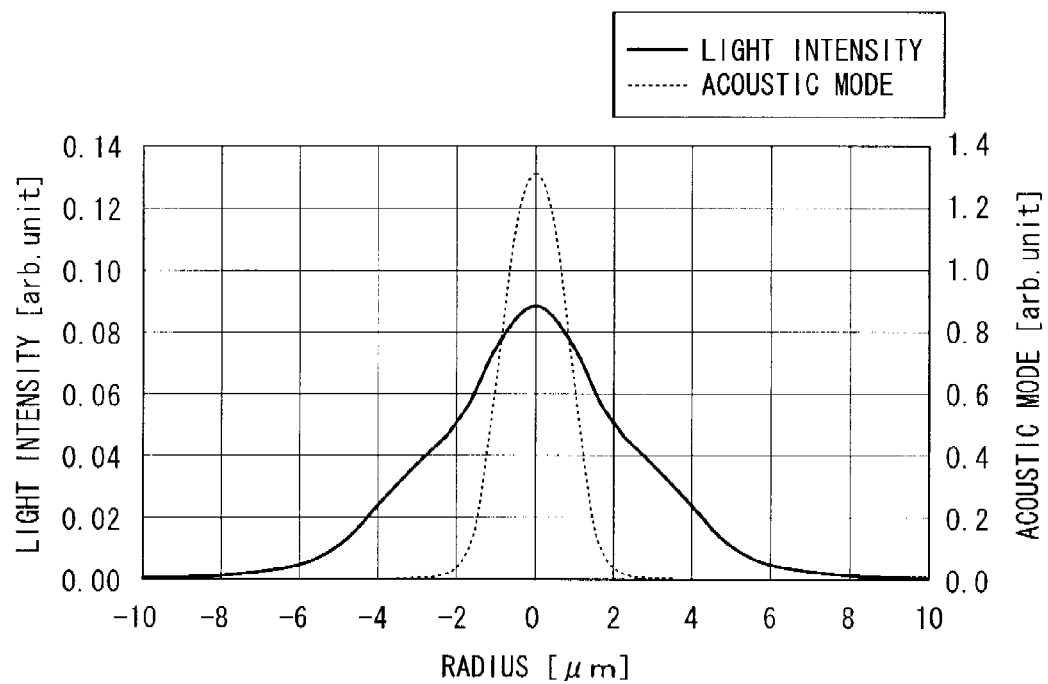
FIG. 37 is a graph showing distributions of a light intensity and an acoustic mode of the optical fiber of the tenth embodiment.

FIG. 36 shows the refractive index profile of a tenth exemplary embodiment. FIG. 36 is an enlarged view of the profile in the vicinity of the core. In the refractive index profile of FIG. 36, a cladding radius is 62.5 μm. An optical fiber of the tenth embodiment includes a central core with a maximum relative refractive index difference Δ1, a second core adjacent to the central core, with a minimum relative refractive index difference Δ2, and a third core adjacent to the second core, with a maximum relative refractive index difference Δ3. Thus, it is composed of the three-layered core and a cladding with a substantially fixed refractive index profile, as in the third to sixth embodiments. However, the optical fiber of this embodiment has, unlike the third to sixth embodiments, a curvy refractive index profile. The definitions of the borders thereof are the same as in the seventh embodiment. Table 7 shows configuration parameters (radius and relative refractive index difference of each layer) and optical characteristics of this configuration. FIG. 37 shows the distributions of the optical power and the acoustic mode of this embodiment.

TABLE 7 r₁: 1.33 μm, Δ₁: 0.66%
r₂: 2.11 μm, Δ₂: 0.15%
r₃: 4.18 μm, Δ₃: 0.50%
r₄: 4.87 μm

| Fiber cut-off wavelength | 1300 nm |
|---|---|
| Cable cut-off wavelength | 1230 nm |
| Mode field diameter (Petermann II) | |
| at 1310 nm | 9.23 μm |
| at 1550 nm | 10.15 μm |
| Zero-dispersion wavelength | 1333.5 nm |
| Chromatic dispersion value | |
| at 1310 nm | −2.21 ps/nm/km |
| at 1550 nm | 16.32 ps/nm/km |

TABLE 7-continued $r_1$: 1.33 μm, $\Delta_1$: 0.66%
$r_2$: 2.11 μm, $\Delta_2$: 0.15%
$r_3$: 4.18 μm, $\Delta_3$: 0.50%
$r_4$: 4.87 μm Bending loss

| | | |
|---|---|---|
| at a diameter of 20 mm, 1310 nm | 0.5 | dB/m |
| at a diameter of 20 mm, 1550 nm | 9.8 | dB/m |
| Optical MFD at 1550 nm | 6.77 | μm |
| Acoustic MFD | 2.24 | μm |

Figure 38:
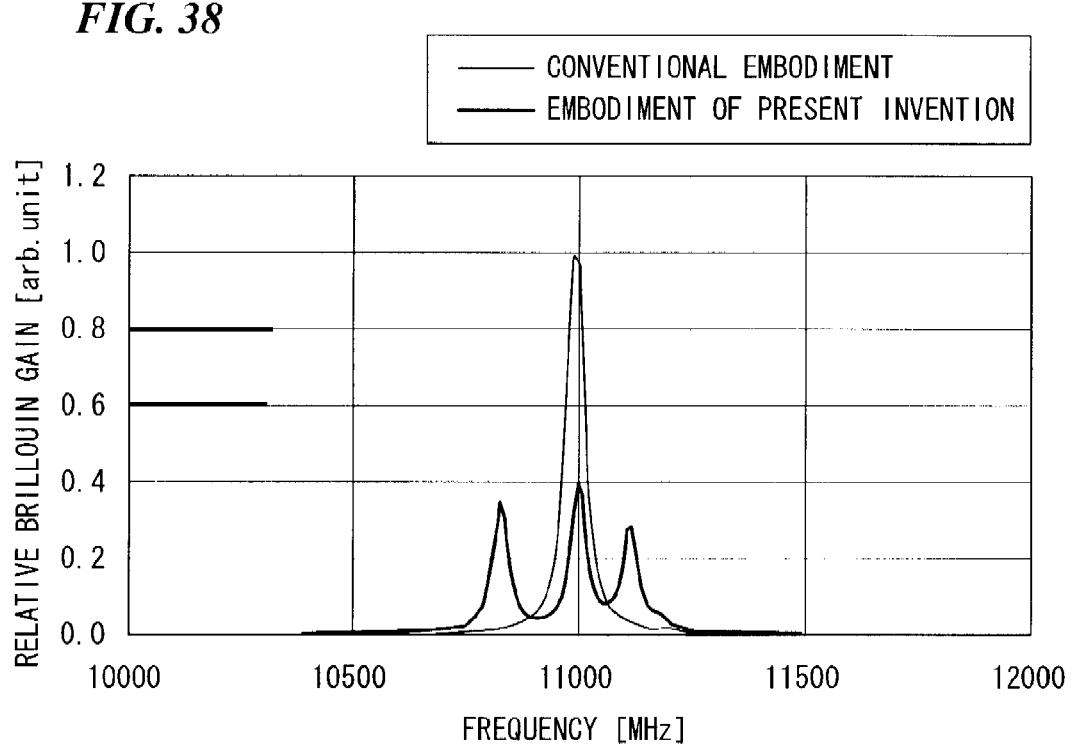
FIG. 38 is a graph showing a Brillouin spectrum of the optical fiber of the tenth embodiment.

The optical fiber of this embodiment has about the same MFD as the optical fiber of the related art embodiment. In the optical fiber of this embodiment, as is seen from FIG. 37, the expansion of the acoustic mode is narrower than that of the optical power. The value of (Acoustic MFD)/(Optical MFD) is 0.33, which is about half that of the related art embodiment. FIG. 38 shows a Brillouin spectrum of the optical fiber of this embodiment. The maximum peak in the vicinity of 11000 MHz is reduced to about half that of the conventional embodiment. Furthermore, there are peaks in the vicinity of 10830 and 11120 MHz, about as high as the maximum peak. Therefore, it is effective in improving the SBS threshold power. The SBS threshold power measured was 14.3 dBm in the optical fiber with a length of 20 km. Thus, an improvement by 5.6 dB over the related art fiber was confirmed.

Figure 39:
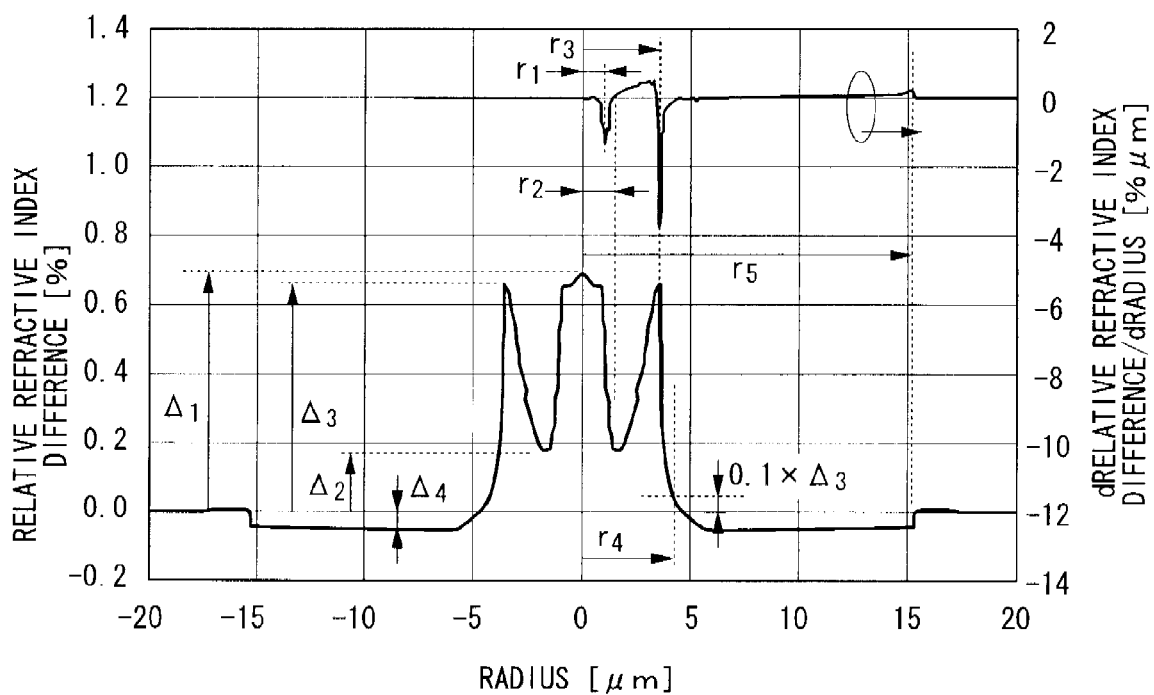
FIG. 39 is a graph showing a refractive index profile of an optical fiber of an eleventh embodiment.
Figure 40:
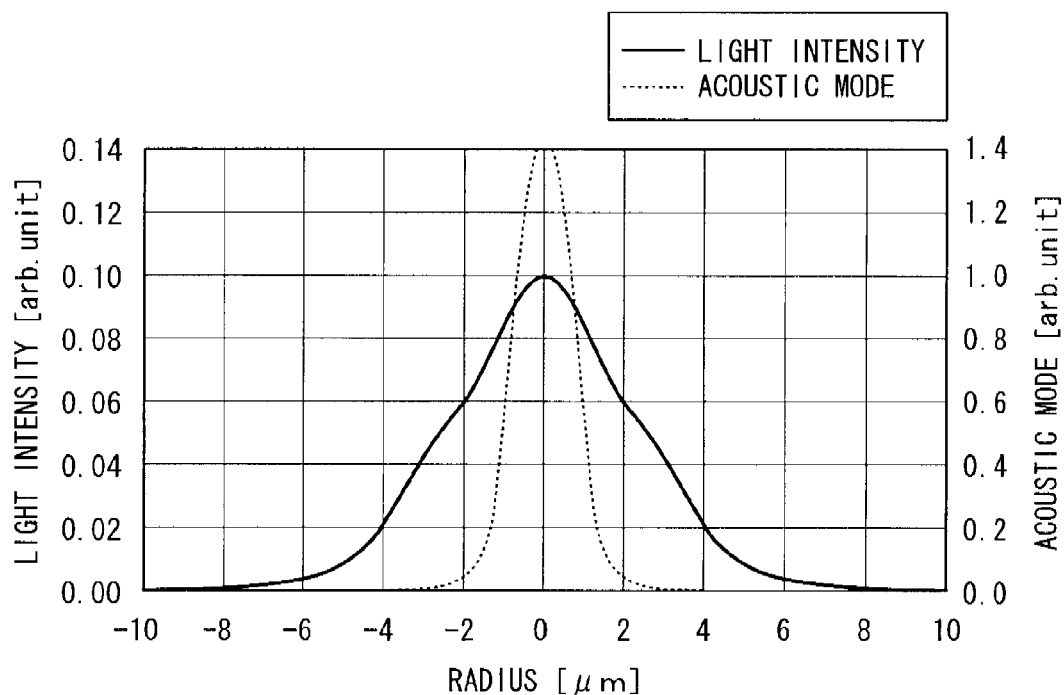
FIG. 40 is a graph showing distributions of a light intensity and an acoustic mode of the optical fiber of the eleventh embodiment.

FIG. 39 shows the refractive index profile of an eleventh exemplary embodiment. FIG. 39 is an enlarged view of the profile in the vicinity of the core. In the refractive index profile of FIG. 39, a cladding radius is 62.5 μm. An optical fiber of the eleventh embodiment includes a central core with a maximum relative refractive index difference $\Delta 1$, a second core adjacent to the central core, with a minimum relative refractive index difference $\Delta 2$, and a third core adjacent to the second core, with a maximum relative refractive index difference $\Delta 3$. Thus, it is composed of the three-layered core and a cladding with a substantially fixed refractive index profile, as in the third to sixth embodiments. However, the optical fiber of this embodiment has, unlike the third to sixth embodiments, a curvy refractive index profile. The definitions of the borders thereof are the same as in the seventh embodiment. Table 8 shows configuration parameters (radius and relative refractive index difference of each layer) and optical characteristics of this configuration. FIG. 40 shows the distributions of the optical power and the acoustic mode of this embodiment. The zero-dispersion wavelength is 1323.9 nm, which satisfies ITU-T G.652.

TABLE 8

$r_1$: 1.07 μm, $\Delta_1$: 0.68%
$r_2$: 1.54 μm, $\Delta_2$: 0.18%
$r_3$: 3.43 μm, $\Delta_3$: 0.66%
$r_4$: 4.15 μm, $\Delta_4$: −0.05%
$r_5$: 15.29 μm

| | | |
|---|---|---|
| Fiber cut-off wavelength | 1290 | nm |
| Cable cut-off wavelength | 1225 | nm |
| Mode field diameter (Petermann II) | | |
| at 1310 nm | 8.40 | μm |
| at 1550 nm | 9.43 | μm |
| Zero-dispersion wavelength | 1323.9 | nm |
| Chromatic dispersion value | | |
| at 1310 nm | −0.96 | ps/nm/km |
| at 1550 nm | 16.60 | ps/nm/km |

TABLE 8-continued $r_1$: 1.07 μm, $\Delta_1$: 0.68%
$r_2$: 1.54 μm, $\Delta_2$: 0.18%
$r_3$: 3.43 μm, $\Delta_3$: 0.66%
$r_4$: 4.15 μm, $\Delta_4$: −0.05%
$r_5$: 15.29 μm Bending loss

| | | |
|---|---|---|
| at a diameter of 20 mm, 1310 nm | <0.01 | dB/m |
| at a diameter of 20 mm, 1550 nm | 1.33 | dB/m |
| Optical MFD at 1550 nm | 6.68 | μm |
| Acoustic MFD | 2.01 | μm |

Figure 41:
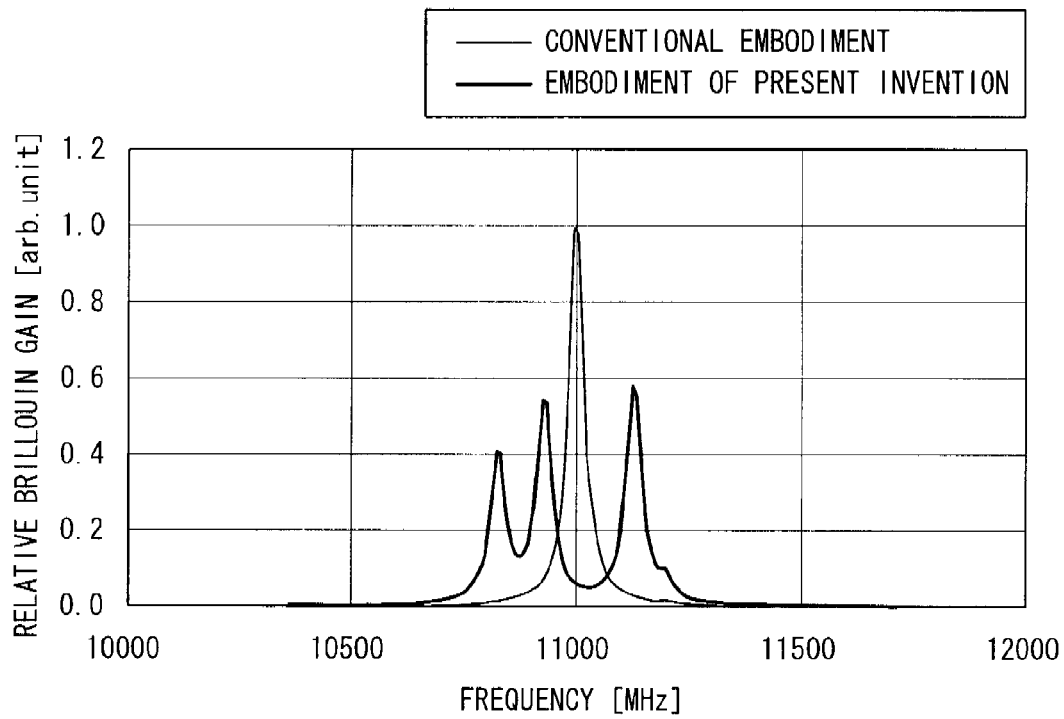
FIG. 41 is a graph showing a Brillouin spectrum of the optical fiber of the eleventh embodiment.

The optical fiber of this embodiment has about the same MFD as the optical fiber of the related art embodiment. In the optical fiber of this embodiment, as is seen from FIG. 40, the expansion of the acoustic mode is narrower than that of the optical power. The value of (Acoustic MFD)/(Optical MFD) is 0.30, which is about half that of the related art embodiment. FIG. 41 shows a Brillouin spectrum of the optical fiber of this embodiment. The maximum peak in the vicinity of 11120 MHz is reduced to about half that of the related art embodiment. Furthermore, there are peaks in the vicinity of 10820 and 10920 MHz, about as high as the maximum peak. Therefore, it is effective in improving the SBS threshold power. The SBS threshold power measured was 13.1 dBm in the optical fiber with a length of 20 km. Thus, an improvement by 4.4 dB over the related art fiber was confirmed.

Figure 42:
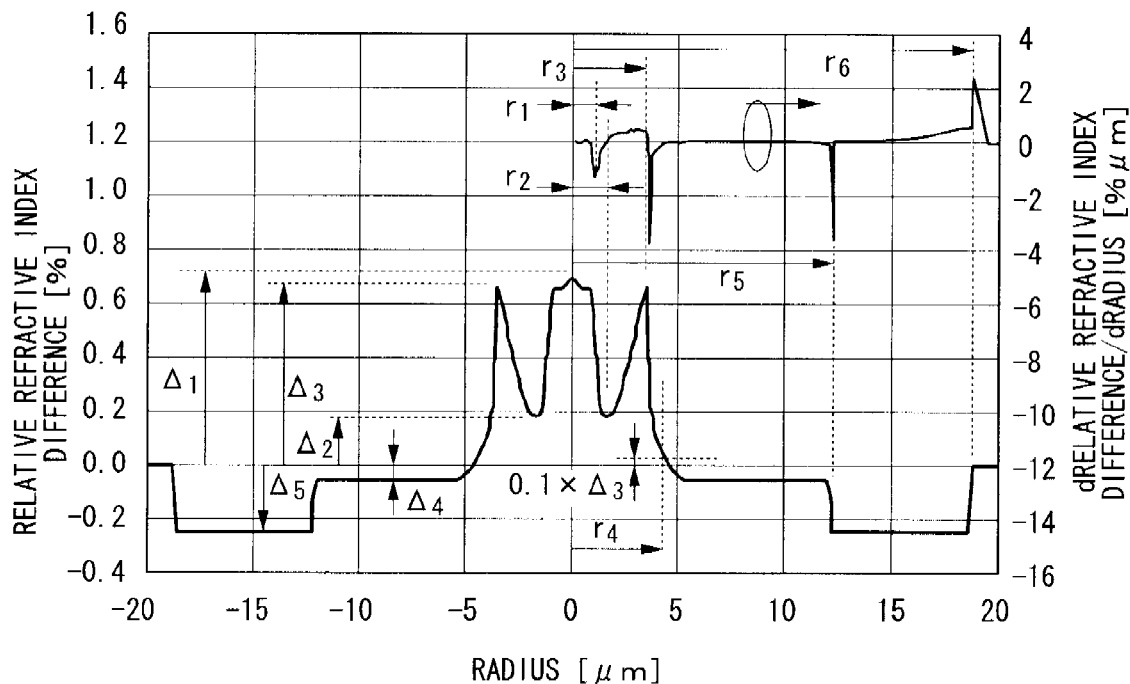
FIG. 42 is a graph showing a refractive index profile of an optical fiber of a twelfth embodiment.
Figure 43:
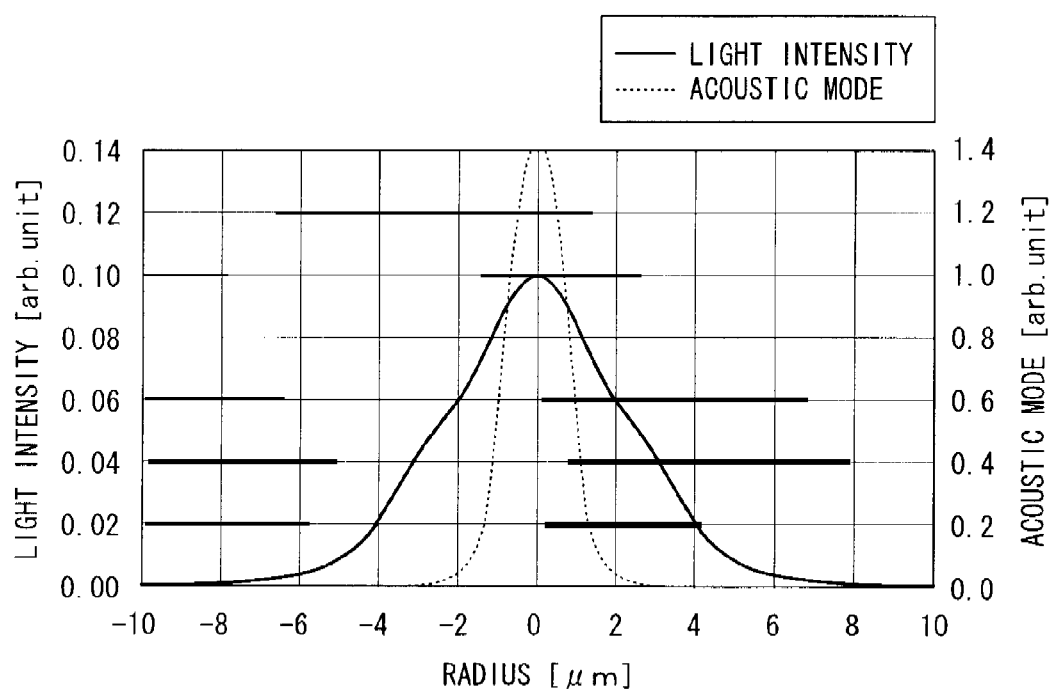
FIG. 43 is a graph showing distributions of a light intensity and an acoustic mode of the optical fiber of the twelfth embodiment.

FIG. 42 shows the refractive index profile of a twelfth exemplary embodiment. FIG. 42 is an enlarged view of the profile in the vicinity of the core. In the refractive index profile of FIG. 42, a cladding radius is 62.5 μm. An optical fiber of the twelfth embodiment includes a three-layered core similar to that of the eleventh embodiment, and further includes a three-layered cladding. Letting a relative refractive index difference of a first cladding on the core side be $\Delta 4$ and a relative refractive index difference of a second cladding, with a low refractive index, on the outside of the first cladding be $\Delta 5$, their relation is represented by $\Delta 5 < \Delta 4 < 0$. Table 9 shows configuration parameters (radius and relative refractive index difference of each layer) and optical characteristics of this configuration. FIG. 43 shows the distributions of the optical power and the acoustic mode of this embodiment. The zero-dispersion wavelength is 1319.8 nm, which satisfies ITU-T G.652. This embodiment has a bending loss about one digit smaller than the eleventh embodiment, the embodiments having substantially the same MFD.

TABLE 9

$r_1$: 1.12 μm, $\Delta_1$: 0.68%
$r_2$: 1.67 μm, $\Delta_2$: 0.18%
$r_3$: 3.50 μm, $\Delta_3$: 0.66%
$r_4$: 4.16 μm, $\Delta_4$: −0.05%
$r_5$: 12.27 μm, $\Delta_5$: −0.25%
$r_6$: 18.86 μm

| | | |
|---|---|---|
| Fiber cut-off wavelength | 1292 | nm |
| Cable cut-off wavelength | 1228 | nm |
| Mode field diameter (Petermann II) | | |
| at 1310 nm | 8.40 | μm |
| at 1550 nm | 9.42 | μm |
| Zero-dispersion wavelength | 1319.8 | nm |
| Chromatic dispersion value | | |
| at 1310 nm | −0.89 | ps/nm/km |
| at 1550 nm | 16.87 | ps/nm/km |

TABLE 9-continued $r_1$: 1.12 μm, $\Delta_1$: 0.68%
$r_2$: 1.67 μm, $\Delta_2$: 0.18%
$r_3$: 3.50 μm, $\Delta_3$: 0.66%
$r_4$: 4.16 μm, $\Delta_4$: −0.05%
$r_5$: 12.27 μm, $\Delta_5$: −0.25%
$r_6$: 18.86 μm

| Bending loss | |
|---|---|
| at a diameter of 20 mm, 1310 nm | <0.01 dB/m |
| at a diameter of 20 mm, 1550 nm | 0.13 dB/m |
| Optical MFD at 1550 nm | 6.69 μm |
| Acoustic MFD | 2.02 μm |

Figure 44:
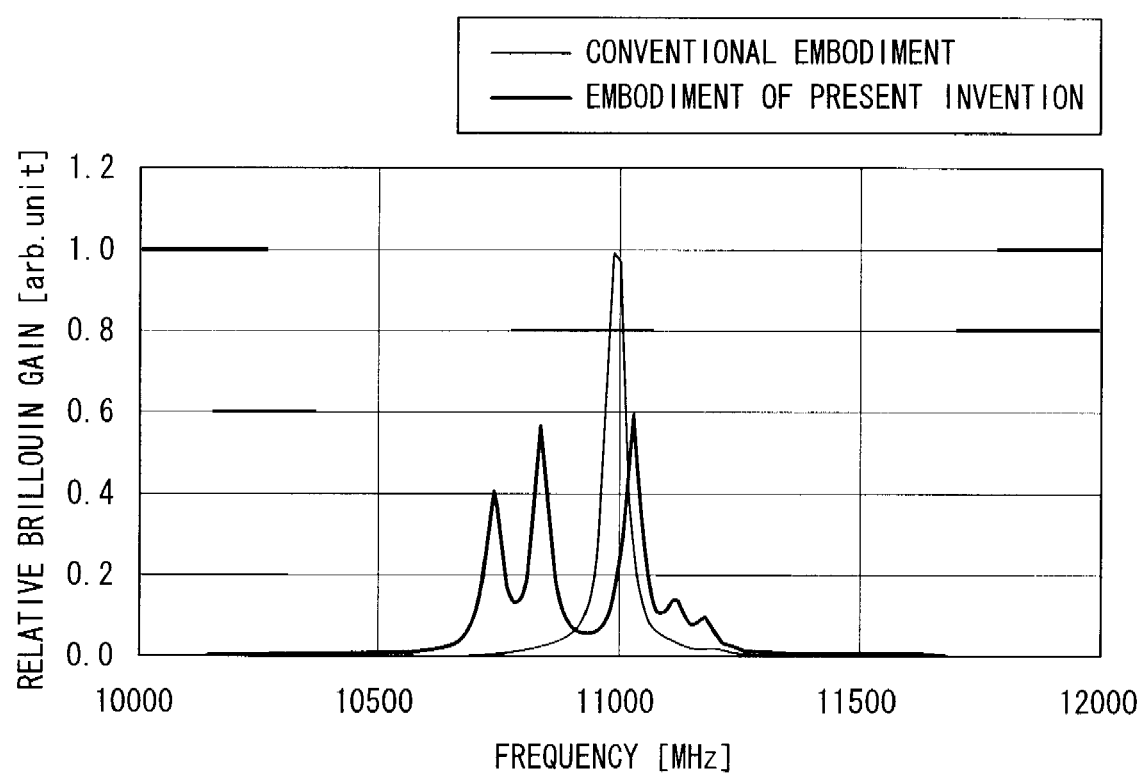
FIG. 44 is a graph showing a Brillouin spectrum of the optical fiber of the twelfth embodiment.

The optical fiber of this embodiment has an MFD smaller than the optical fiber of the related art embodiment. As is the case with the fourth embodiment, in the related art configuration, the MFD of the fiber of this embodiment would be expected to cause the SBS threshold power to be degraded. However, in the optical fiber of this embodiment, as is seen from FIG. 43, the expansion of the acoustic mode is narrower than that of the optical power, and the value of (Acoustic MFD)/(Optical MFD) is 0.30, which is about half that of the related art embodiment. FIG. 44 shows a Brillouin spectrum of the optical fiber of this embodiment. The maximum peak in the vicinity of 11030 MHz is reduced to about half that of the related art embodiment. Furthermore, there are peaks in the vicinity of 10740 and 10840 MHz, about as high as the maximum peak. Therefore, it is effective in improving the SBS threshold power. The SBS threshold power measured was 13.2 dBm in the optical fiber with a length of 20 km. Thus, an improvement by 4.5 dB over the related art fiber was confirmed.

Figure 45:
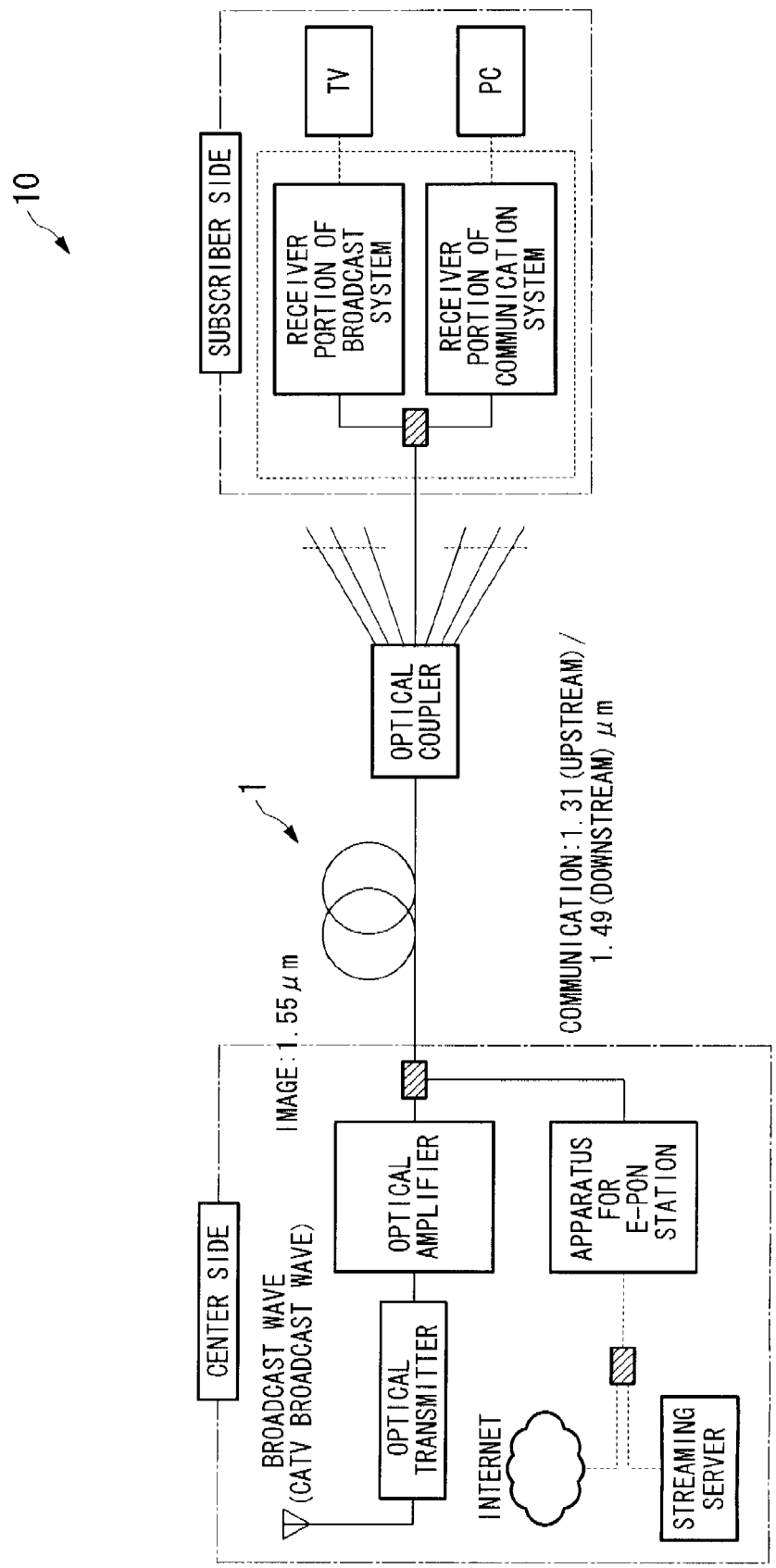
FIG. 45 shows a transmission system (wavelength division multiplexing system) configured by use of the optical fiber of the present invention.

FIG. 45 shows a transmission system (wavelength division multiplexing system) 10 with a PON configuration in which an optical fiber 1 according to an embodiment of the present invention is used. The transmission system 10 transmits a data signal at frequencies of 1.31 μm and 1.49 μm, and an image signal at a frequency of 1.55μm in compliance with the definitions of ITU-T G.983.3. FIG. 45 shows a digital image distribution over the Internet or by streaming, by way of example of a data transmission. However, a voice data transmission is available by adding an appropriate apparatus. For an image transmission at a frequency band of 1.55 μm, a system is widely used in which a typical broadcast wave is propagated in the form of an as-is analog signal. In such a system, a signal can be demodulated into the signal of the original broadcast wave in a receiver portion of the broadcast system on the subscriber side. Therefore, a conventional television set can be used as it is.

The system of FIG. 45 transmits a data signal and an analog signal (image signal) through the single optical fiber 1. However, in the transmission system of the present invention, an optical fiber for a data signal and an optical fiber for an analog signal, separate from each other, may be used. In such a system, using the optical fiber of the present invention offers an advantage such as an extension in transmission distance.

While exemplary embodiments of the present invention have been described above, these should not be considered to limit the invention. Addition, omission, and replacement of the constituents, and other modifications can be made without departing from the spirit or scope of the invention. The present invention is not limited by the descriptions above, but is limited only by the appended claims.

The invention claimed is:

1. An optical fiber, wherein a first mode field diameter of the optical fiber, that is the mode field diameter of a dominant mode of an acoustic mode generated in the optical fiber, is different from a second mode field diameter of the optical fiber, that is the mode field diameter of a light intensity distribution of the optical fiber, and the first mode field diameter is at most ⅔ of the second mode field diameter.

2. The optical fiber according to claim 1, wherein the first mode field diameter is
at most 6 μm.

3. The optical fiber according to claim 1, wherein by reducing an overlap between an acoustic field distribution and a light power distribution of the optical fiber, occurrence of simulated Brillouin scattering is less frequent than a case of an optical fiber comprising a core having a uniform refractive index.

4. The optical fiber according to claim 3, wherein by expanding the acoustic field distribution of the optical fiber to be larger than the light power distribution thereof, an overlap between the acoustic field distribution and the light power distribution is reduced.

5. The optical fiber according to claim 3, wherein by making the acoustic field distribution of the optical fiber smaller than the light power distribution thereof, an overlap between the acoustic field distribution and the light power distribution is reduced.

6. The optical fiber according to claim 1, having a simulated Brillouin threshold power 1.5 or more times larger than that of an optical fiber comprising a core having a uniform refractive index.

7. The optical fiber according to claim 1, having a simulated Brillouin threshold power two or more times larger than that of an optical fiber comprising a core having a uniform refractive index.

8. The optical fiber according to claim 1, wherein a cable cut-off wavelength is 1260 nm or less, a mode field diameter at a wavelength of 1310 nm is 7.9 μm or more and 10.2 μm or less, and a zero-dispersion wavelength is in a range of 1300 nm to 1324 nm.

9. The optical fiber according to claim 1, having a core at a central portion thereof and a cladding around a periphery of the core, the cladding being composed of two or more layers with different refractive indexes.

10. The optical fiber according to claim 9, wherein the cladding is composed of two layers, and letting a cladding adjacent to the core be a first cladding, a cladding adjacent to an outer periphery of the first cladding be a second cladding, a refractive index of the first cladding be nc1, and a refractive index of the second cladding be nc2, wherein nc1<nc2.

11. The optical fiber according to claim 9, wherein the cladding is composed of three layers, and letting a cladding adjacent to the core be a first cladding, a cladding adjacent to an outer periphery of the first cladding be a second cladding, a cladding adjacent to an outer periphery of the second cladding be a third cladding, a refractive index of the first cladding be nc1, a refractive index of the second cladding be nc2, and a refractive index of the third cladding be nc3, wherein nc2<nc1<nc3.

12. The optical fiber according to claim 1, having three or more peaks that satisfy $g(i) \geq [0.1 \times Max(g)]$, where: $g(i)$ is an i-th peak gain from the lowest frequency of a Brillouin spectrum; and $Max(g)$ is the maximum gain among a plurality of existing peaks.

13. The optical fiber according to claim 1, having two or more peaks that satisfy $g(i) \geq [0.5 \times Max(g)]$, where $g(i)$ is an i-th peak gain from the lowest frequency of a Brillouin spectrum; and Max(g) is the maximum gain among a plurality of existing peaks.

14. The optical fiber according to claim 1, having three or more peaks that satisfy $g(i) \geq [05. \times Max(g)]$, where: $g(i)$ is an i-th peak gain from the lowest frequency of a Brillouin spectrum; and Max(g) is the maximum gain among a plurality of existing peaks.

15. A transmission system comprising the optical fiber according to claim 1, the system configured to perform an analog signal transmission, a baseband transmission, or an optical SCM transmission.

16. A wavelength division multiplexing system comprising the optical fiber according to claim 1, the system configured to perform:
   at least one of: a data transmission and a voice transmission, and
   at least one of: an analog signal transmission and a baseband transmission and an optical SCM transmission.

17. An optical fiber, having two or more peaks that satisfy $g(i) \geq [0.1 \times Max(g)]$, where $g(i)$ is an i-th peak gain from the lowest frequency of a Brillouin spectrum; and Max(g) is the maximum gain among a plurality of existing peaks.

18. The optical fiber according to claim 17, a first mode field diameter in a dominant mode of an acoustic mode generated in the optical fiber is most ⅔ of a second mode field diameter in a light intensity distribution of the optical fiber.

19. The optical fiber according to claim 18, wherein the first mode field diameter in the dominant mode of the acoustic mode generated in the optical fiber is at most 6 μm.

20. The optical fiber according to claim 17, wherein by reducing an overlap between an acoustic field distribution and a light power distribution of the optical fiber, occurrence of simulated Brillouin scattering is less frequent than that of an optical fiber comprising a core having a constant refractive index and a cladding, surrounding the core, having a uniform refractive index lower than that of the core.

21. The optical fiber according to claim 20, wherein by expanding the acoustic field distribution of the optical fiber to be larger than the light power distribution thereof, an overlap between the acoustic field distribution and the light power distribution is reduced.

22. The optical fiber according to claim 20, wherein by making the acoustic field distribution of the optical fiber smaller than the light power distribution thereof, an overlap between the acoustic field distribution and the light power distribution is reduced.

23. The optical fiber according to claim 17, having a simulated Brillouin threshold power 1.5 or more times larger than that of an optical fiber comprising a core having a uniform refractive index.

24. The optical fiber according to claim 17, having a simulated Brillouin threshold power two or more times larger than that of an optical fiber comprising a core having a uniform refractive index.

25. The optical fiber according to claim 17, wherein a cable cut-off wavelength is 1260 nm or less, a mode field diameter at a wavelength of 1310 nm is most 10.2 μm, and a zero-dispersion wavelength is in a range of 1300 nm to 1324 nm.

26. The optical fiber according to claim 17, having a core at a central portion thereof and a cladding around a periphery of the core, the cladding being composed of two or more layers with different refractive indexes.

27. The optical fiber according to claim 26, wherein the cladding is composed of two layers, and letting a cladding adjacent to the core be a first cladding, a cladding adjacent to an outer periphery of the first cladding be a second cladding, a refractive index of the first cladding be nc1, and a refractive index of the second cladding be nc2, wherein nc1<nc2.

28. The optical fiber according to claim 26, wherein the cladding is composed of three layers, and letting a cladding adjacent to the core be a first cladding, a cladding adjacent to an outer periphery of the first cladding be a second cladding, a cladding adjacent to an outer periphery of the second cladding be a third cladding, a refractive index of the first cladding be nc1, a refractive index of the second cladding be nc2, and a refractive index of the third cladding be nc3, wherein nc2<nc1<nc3.

29. The optical fiber according to claim 17, having three or more peaks that satisfy $g(i) \geq [0.1 \times Max(g)]$.

30. The optical fiber according to claim 17, having two or more peaks that satisfy $g(i) \geq [0.5 \times Max(g)]$.

31. The optical fiber according to claim 17, having three or more peaks that satisfy $g(i) \geq [0.5 \times Max(g)]$.

32. A transmission system comprising the optical fiber according to claim 17, the system configured to perform at least one of an analog signal transmission, a baseband transmission, and an optical SCM transmission.

33. A wavelength division multiplexing system comprising the optical fiber according to claim 17, the system configured to perform:
   at least one of a data transmission and a voice transmission, and
   at least one of an analog signal transmission and a baseband transmission and an optical SCM transmission.

* * * * *